(12) United States Patent
Karczewicz et al.

(10) Patent No.: US 9,078,007 B2
(45) Date of Patent: Jul. 7, 2015

(54) DIGITAL VIDEO CODING WITH INTERPOLATION FILTERS AND OFFSETS

(75) Inventors: Marta Karczewicz, San Diego, CA (US); Giovanni Motta, San Diego, CA (US); Yan Ye, San Diego, CA (US); Peisong Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 12/432,544

(22) Filed: Apr. 29, 2009

(65) Prior Publication Data

US 2010/0111182 A1    May 6, 2010

Related U.S. Application Data

(60) Provisional application No. 61/102,789, filed on Oct. 3, 2008.

(51) Int. Cl.
*H04N 19/147* (2014.01)
*H04N 19/61* (2014.01)
(Continued)

(52) U.S. Cl.
CPC ........... *H04N 19/577* (2014.11); *H04N 19/147* (2014.11); *H04N 19/61* (2014.11);
(Continued)

(58) Field of Classification Search
CPC ... H04N 19/147; H04N 19/61; H04N 19/117; H04N 19/136; H04N 19/577; H04N 19/192; H04N 19/82; H04N 19/523; H04N 19/59; H04N 19/19
USPC .......... 375/240.01–240.29; 382/45, 232, 233, 382/236, 239, 251, 261, 263, 264, 260, 269, 382/266, 238, 224; 348/699, 718, 409, 413, 348/416, 606, 614, 620, 714, 763, 404, 407, 348/411, 412, 415, 280, 223, 272, 273, 348/223.1, 241, 607, 146
See application file for complete search history.

(56) References Cited

U.S. PATENT DOCUMENTS 7,835,440 B2 * 11/2010 Chono ................. 375/240.16
2003/0052995 A1 * 3/2003 Hsu et al. .................. 348/448
(Continued)

FOREIGN PATENT DOCUMENTS

CN  1625902 A  6/2005
CN  1926875 A  3/2007
(Continued)

OTHER PUBLICATIONS

International Search Report & Written Opinion—PCT/US2009/043391—International Search Authority, European Patent Office, Oct. 11, 2009.
(Continued)

*Primary Examiner* — Behrooz Senfi
*Assistant Examiner* — Mohammed Jebari
(74) *Attorney, Agent, or Firm* — Todd E. Marlette

(57) ABSTRACT

This disclosure describes techniques for encoding digital video data using interpolation filters and offsets. An encoder may be configured to select interpolation filters for sub-pixel precision motion estimation based on historical interpolation results obtained for previously encoded video units, such as frames or slices. The encoder also may be configured to compute and assign offsets to the sub-pixel positions after interpolation based on differences between a reference unit and the unit to be coded. The computation and assignment of offsets may be performed before motion estimation. Motion estimation may be refined so that the motion search considers sub-pixel positions to which offsets have been previously added and evaluates sub-pixel positions that have a non-zero offset. In some cases, interpolation filter selection, offset computation, and/or refined motion estimation for a given unit may be performed in a single encoding pass.

41 Claims, 9 Drawing Sheets

(51) Int. Cl.
| | |
|---|---|
| *H04N 19/117* | (2014.01) |
| *H04N 19/136* | (2014.01) |
| *H04N 19/19* | (2014.01) |
| *H04N 19/192* | (2014.01) |
| *H04N 19/82* | (2014.01) |
| *H04N 19/523* | (2014.01) |
| *H04N 19/59* | (2014.01) |
| H04N 19/80 | (2014.01) |
| H04N 19/577 | (2014.01) |

(52) U.S. Cl.
CPC .......... *H04N 19/117* (2014.11); *H04N 19/136* (2014.11); *H04N 19/19* (2014.11); *H04N 19/192* (2014.11); *H04N 19/82* (2014.11); *H04N 19/523* (2014.11); *H04N 19/59* (2014.11)

(56) References Cited

U.S. PATENT DOCUMENTS

| | | | | |
|---|---|---|---|---|
| 2003/0156646 | A1* | 8/2003 | Hsu et al. | 375/240.16 |
| 2003/0202607 | A1* | 10/2003 | Srinivasan | 375/240.29 |
| 2004/0076333 | A1* | 4/2004 | Zhang et al. | 382/238 |
| 2005/0053143 | A1* | 3/2005 | Holcomb et al. | 375/240.16 |
| 2005/0105617 | A1* | 5/2005 | Chono | 375/240.16 |
| 2005/0243931 | A1* | 11/2005 | Yasuda et al. | 375/240.16 |
| 2006/0264243 | A1 | 11/2006 | Aarras | |
| 2007/0133687 | A1* | 6/2007 | Wittmann et al. | 375/240.17 |
| 2008/0075165 | A1* | 3/2008 | Ugur et al. | 375/240.12 |
| 2008/0204600 | A1 | 8/2008 | Xu et al. | |
| 2008/0247467 | A1* | 10/2008 | Rusanovskyy et al. | 375/240.16 |
| 2008/0253459 | A1* | 10/2008 | Ugur et al. | 375/240.17 |
| 2009/0022220 | A1* | 1/2009 | Vatis et al. | 375/240.12 |

FOREIGN PATENT DOCUMENTS

| | | |
|---|---|---|
| DE | 20102205 | 8/2001 |
| EP | 1499134 A1 | 1/2005 |
| JP | 2011530075 A | 12/2011 |
| JP | 2012503901 A | 2/2012 |
| KR | 20080078607 A | 8/2008 |
| WO | WO0176154 A2 | 10/2001 |
| WO | 02063439 A2 | 8/2002 |
| WO | WO2006108654 A2 | 10/2006 |
| WO | 2008068623 A2 | 6/2008 |
| WO | 2008084378 A2 | 7/2008 |
| WO | WO2010034204 A1 | 4/2010 |

OTHER PUBLICATIONS

Kang, D., et al: "UPnP AV Architectural Multimedia System with a Home Gateway Powered by the OSGi Platform" IEEE Transactions on Consumer Electronics, IEEE Service Center, New York, NY, US, Jan. 1, 2005, pp. 87-93, XP003024274 ISSN: 0098-3063 p. 87, right-hand column, paragraph 1—p. 91, left-hand column, paragraph 1 figures 5-9.

Karczewicz M et al: "Single Pass Encoding using Switched Interpolation Filters with Offset" 36. VCEG Meeting; Aug. 10, 2008-Oct. 10, 2008; San Diego, US; (Video Coding Experts Group of ITU-T SG.16),, Oct. 8, 2008, XP030003651.

Karczewicz M et al: "Switched interpolation filter with offset" 35. VCEG Meeting; 85. MPEG Meeting; Jul. 16, 2008-Jul. 18, 2008; Berlin; (Video Coding Experts Group of ITU-T SG.16),, Jul. 12, 2008, XP030003600.

Partial International Search Report PCT/US09/061196, International Search Authority—European Patent Office—Feb. 26, 2010.

Vatis Y et al: "Motion-And Aliasing-Compensated Prediction Using a Two-Dimensional Non-Separable Adaptive Wiener Interpolation Filter" Image Processing, 2005. ICIP 2005. IEEE International Conference on Genova, Italy Sep. 11-14, 2005, Piscataway, NJ, USA, IEEE, vol. 2, Sep. 11, 2005, pp. 894-897, XP010851198 ISBN: 978-0-7803-91 34-5.

Vatis, Y. et al: "Prediction of P- and B-Frames Using Two-Dimensional Non-Separable Adaptive Wiener Interpolation Filter for H.264/AVC" Joint Video Team (JVT) of ISO/IEC MPEG & ITU-T VCEG(ISO/IEC JTC1/SC29/WG11 and ITU-T SG16 Q6), XX, XX, No. VCEG-AD08, Oct. 29, 2006, XP030003499.

Wedi T: "Adaptive interpolation filters and high-resolution displacements for video coding" IEEE Transactions on Circuits and Systems for Video Technology, IEEE Service Center, Piscataway, NJ, US, vol. 16, No. 4, Apr. 1, 2006, pp. 484-491, XP002464225.

Yunjung Park et al: "Home multimedia integration system using UPnP and Service Convergence Gateway engine" Research, Innovation and Vision for the Future, 2008. RIVF 2008. IEEE International Conference on, IEEE, Piscataway, NJ, USA, Jul. 13, 2008, pp. 184-190, XP031296000 ISBN: 978-1-4244-2379-8 p. 184, right-hand column, paragraph 2—right-hand column, paragraph 5 left-hand column, paragraph 4—left-hand column, paragraph 2 right-hand column, paragraph 5—p. 189, left-hand column, paragraph 1 figures 2-4.

Yuri Vatis et al: "Locally Adaptive Non-Separable Interpolation Filter for H. 264/AVC" Image Processing, 2006 IEEE International Conference on, IEEE, PI, Oct. 1, 2006, pp. 33-36, XP031048566 ISBN: 978-1-4244-0480-3.

Y. Vatis and J. Ostermann, "Comparison of complexity between two-dimensional non-separable adaptive interpolation filter and standard wiener filter," ITU-T SGI 16/Q.6 Doc. VCEG-AA11, Nice, France, Oct. 16-22, 2005.

S. Wittmann, T. Wedi, "Separable Adaptive Interpolation Filter," ITU-T SG16/Q.6 Doc. T05-SG16-C-0219, Geneva, Switzerland, Jun. 29-Jul. 5, 2007.

Y. Vatis, B. Edler, D.T. Nguyen, J. Ostermann, "Two-dimensional non-separable Adaptive Wiener Interpolation Filter for H.264/AVC," ITU-T-SGI 16/Q.6 Doc. VCEG-Z17, Busan, Korea, Apr. 16-22, 2005.

G. Motta, Y. Ye, M. Karczewicz, "Improved Filter Selection for B-Slices in E-AIF," ITU-T SGI 16/Q.6 Doc. VCEG-AI38, Berlin, Germany, Jul. 16-18, 2008.

M. Karczewicz, Y. Ye, P. Chen, "Switched Interpolation Filter with Offset," ITU-T SGI 16/Q.6 Doc. VCEG-AI35, Berlin, Germany, Jul. 16-18, 2008.

Karczewicz, Marta, et al., "Advanced Interpolation Techniques for Motion Compensation in Video Coding," U.S. Appl. No. 12/420,235, filed Apr. 8, 2009.

Karczewicz, Marta, et al., "Offsets At Sub-Pixel Resolution," U.S. Appl. No. 12/420,280, filed Apr. 8, 2009.

Motta, Giovanni, et al., "Video Encoding by Filter Selection," U.S Appl. No. 12,208,269, filed Sep. 10, 2008.

Qualcomm: "Switched Interpolation Filter with Offset" ITU-T SG16/Q.6 Doc. T05-SG-C 463-E, International Telecommunication Union, Geneva, CH, Apr. 14, 2008, pp. 1-4, XP007908845.

Taiwan Search Report—TW098115897—TIPO—Apr. 5, 2013.

Karczewicz M., Improved Filter Selection for B-slices in E-AIF,ITU—Telecommunications Standardization Sector Study Group 16 Question 6 Video Coding Experts Group, Jul. 12, 2008, URL,http://wftp3.itu.int/av-arch/video-site/0807_Ber/VCEG-AI38.zip, pp. 1-2.

\* cited by examiner

DIGITAL VIDEO CODING WITH INTERPOLATION FILTERS AND OFFSETS

This application claims the benefit of U.S. Provisional Application No. 61/102,789, filed Oct. 3, 2008, which is hereby incorporated by reference in its entirety.

TECHNICAL FIELD

This disclosure relates to digital video coding and, more particularly, video coding techniques in which interpolation filters and offsets are used.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as those described in standards defined by MPEG-2, MPEG-4, or ITU-T H.264/MPEG-4, Part 10, Advanced Video Coding (AVC), or other standards, to transmit and receive digital video information more efficiently. Video compression techniques may perform spatial prediction and/or temporal prediction to reduce or remove redundancy inherent in video sequences.

Intra-coding relies on spatial prediction to reduce or remove spatial redundancy between video blocks within a given coded unit. Inter-coding relies on temporal prediction to reduce or remove temporal redundancy between video blocks in successive coded units of a video sequence. For inter-coding, a video encoder performs motion estimation and compensation to identify, in reference units, prediction blocks that closely match blocks in a unit to be encoded, and generate motion vectors indicating relative displacement between the coded blocks and the prediction blocks. The difference between the coded blocks and the prediction blocks constitutes residual information. Hence, an inter-coded block can be characterized by one or more motion vectors and residual information.

In some coding processes, motion vectors may have fractional pixel values that permit a video coder to track motion with higher precision than integer pixel values. To support identification of prediction blocks with fractional pixel values, an encoder applies interpolation operations to a reference unit to produce values at sub-pixel positions, such as quarter-pixel or half-pixel positions. The H.264 standard specifies the use of a fixed interpolation scheme for sub-pixel positions. In some cases, different interpolation filters can be selected to improve coding efficiency and prediction quality. For example, an encoder may apply different sets of fixed interpolation filters or adaptive interpolation filters on a selective basis. Also, to further improve the quality of prediction, an encoder may add offsets to sub-pixel position values after interpolation.

SUMMARY

In general, this disclosure describes techniques for encoding digital video data using interpolation filters and offsets. An encoder may be configured to select interpolation filters for sub-pixel precision motion estimation based on historical interpolation results obtained for previously encoded video units, such as frames or slices. The encoder also may be configured to compute and assign offsets to the sub-pixel positions after interpolation based on unit and/or block differences between a reference unit and the unit to be coded. The computation and assignment of offsets may be performed before motion estimation.

In addition, motion estimation may be refined so that the motion search considers sub-pixel positions to which offsets have been previously added and evaluates sub-pixel positions that have a non-zero offset. In some cases, interpolation filter selection, offset computation, and/or refined motion estimation for a given unit may be performed in a single encoding pass. The encoder may, in some examples, accumulate the error for each interpolation filter and each sub-pixel position over each unit, such that the encoder may select interpolation filters that provide the lowest interpolation error at each sub-pixel positions, given historical information for one or more previously encoded units.

In one example, the disclosure provides a video encoding method comprising interpolating sub-integer pixels of a reference video unit using selected interpolation filters before performing motion estimation for a current video unit, applying offsets to at least some of the sub-integer pixels of the reference video unit before performing motion estimation for the current video unit, and encoding a block of the current video unit using motion estimation based on the reference video unit.

In another example, the disclosure provides a video encoding apparatus comprising a video encoder configured to interpolate sub-integer pixels of a reference video unit using selected interpolation filters before performing motion estimation for a current video unit, apply offsets to at least some of the sub-integer pixels of the reference video unit before performing motion estimation for the current video unit, and encode a block of the current video unit using motion estimation based on the reference video unit.

In an additional example, the disclosure provides a computer-readable storage medium encoded with instructions for causing a programmable processor to interpolate sub-integer pixels of a reference video unit using selected interpolation filters before performing motion estimation for a current video unit, apply offsets to at least some of the sub-integer pixels of the reference video unit before performing motion estimation for the current video unit, and encode a block of the current video unit using motion estimation based on the reference video unit.

In some cases, encoding the block may comprise performing motion estimation for the block only once such that encoding is performed in a single pass. A set of interpolation filters may be selected based on historical interpolation results for one or more previously encoded video units. The interpolation filters correspond to respective sub-integer pixels, and the interpolation filters include different interpolation filters for at least some of the sub-integer pixels. The offsets may be determined on a frame basis or block basis.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is a conceptual diagram illustrating integer pixel locations associated with predictive data, and sub-integer pixel locations associated with interpolated predictive data.

FIGS. 5-7 are conceptual diagrams illustrating integer pixel locations of a reference unit with assignment of offset values.

DETAILED DESCRIPTION

Figure 1:
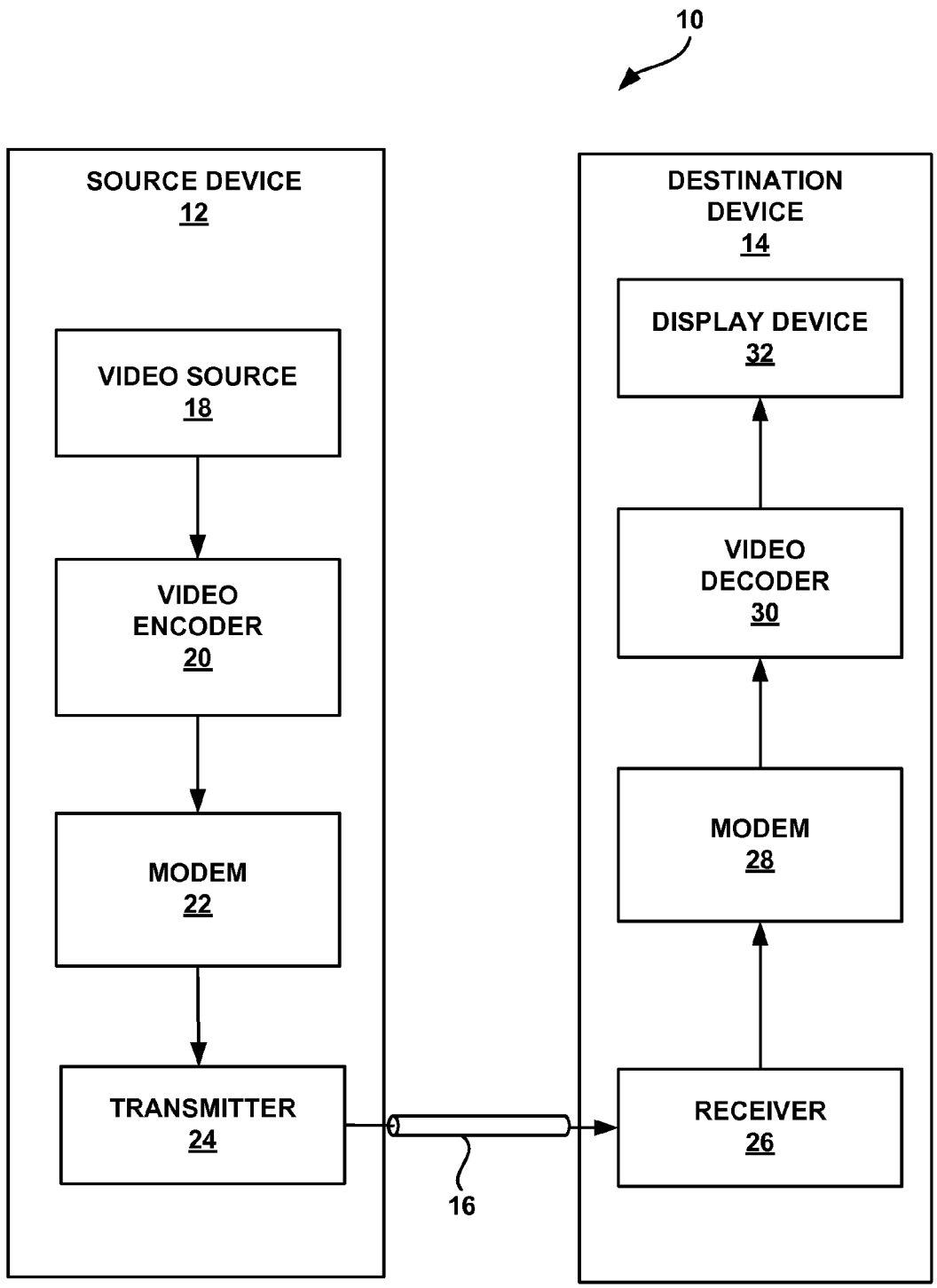
FIG. 1 is a block diagram illustrating an example video encoding and decoding system.

This disclosure describes techniques for encoding digital video data using interpolation and offsets. For example, an encoder may be configured to select interpolation filters and assign offsets to sub-pixel positions in a reference video unit to support motion estimation for a unit to be coded. The coded units may be, for example, video frames or slices including video blocks such as macroblocks. The filters and offsets may be selected in advance of motion estimation for a given unit, based on historical interpolation results for one or more previously coded units, so that coding may be performed in a single pass. Hence, in some cases, encoding the block may comprise performing motion estimation for the block only once, i.e., a single time, such that encoding is performed in a single pass.

Encoding video data in a single pass requires application of motion estimation only once for a given block in a unit to be coded. Instead of performing motion estimation and compensation once to select interpolation filters for respective sub-pixel positions, and then again to apply the selected interpolation filters, an encoder may select interpolation filters based on historical interpolation results obtained for sub-pixel positions of one or more previously encoded units.

In addition, the encoder may be configured to compute and assign offsets to the interpolated sub-pixel positions and before motion estimation is performed for the unit to be coded. The offsets may be determined based on unit and/or block differences between a reference unit and the unit to be coded. In some examples, after selection of interpolation and offsets, motion estimation may be refined so that the motion search is forced to consider offsets previously added to sub-pixel positions and evaluate sub-pixel positions that have non-zero offset values. In some implementations, a combination of these features may permit encoding to be performed in a single pass with improved processing speed and little or no loss of performance.

In some cases, a video encoder may select interpolation filters, to be used for motion estimation for a current unit N, based on interpolation errors produced by motion estimation for a previously coded unit (e.g., N−1), such as a coded unit used as a reference unit for the current unit N. As an example, after the previously coded reference unit N−1 is encoded, interpolation error between blocks in the reference unit N−1 and a previous reference unit (e.g., N−2) may be determined at each of the sub-pixel positions. Using this historical error information for unit N−1, the video encoder may select optimal interpolation filters that would have reduced the error values, and then use those interpolation filters to interpolate sub-pixel values in unit N−1 for use in motion estimation for unit N.

In other cases, given a set of interpolation filters that can be selected for use in sub-pixel motion estimation, a video encoder may accumulate, for each interpolation filter and each sub-pixel position, an interpolation error between a previously encoded unit and its reference unit or units (i.e., cumulative interpolation error values for sub-pixel positions over frames N−1, N−2, N−3, and so forth). This accumulated interpolation error value may serve as historical interpolation results that can be used to select interpolation filters for interpolation of sub-pixel positions in a reference unit to be used in motion estimation for the next unit to be coded. For example, for a given sub-pixel position, the interpolation filter with the lowest accumulated error value may be selected for interpolation.

The accumulated error value may be scaled down over time to prevent overflows and introduce a window effect that weights contributions of more recently coded units more heavily than less recently coded units. For example, the accumulated error value for each interpolation filter as applied to a given sub-pixel position may be a weighted summation of individual error values for the respective interpolation filter and sub-pixel position over a series of multiple coded units, with error values for more recently coded units weighted more heavily. The encoder may evaluate the error values following coding of each unit, and select interpolation filters yielding the lowest accumulated error for respective sub-pixel positions.

Hence, to select interpolation filters, the video encoder may rely on historical interpolation error for one previously coded video unit or multiple previously coded video units. In particular, as described above, a video encoder may select a set of interpolation filters that would have produced an optimal interpolation error for a previously coded unit, and apply them to perform motion estimation for a currently coded unit. In this sense, motion estimation for the current unit is performed using interpolation filters that would have produced an optimal result if they had been used in motion estimation for the previously coded unit. Alternatively, as described above, a video encoder may select interpolation filters that produced cumulative error values over a series of units. In each case, the video encoder relies on historical interpolation results for one or more previously coded units.

DC offset values may be applied to interpolated pixel values, e.g., to compensate for illumination changes between different video coding units. DC offsets may be applied at the frame level such that all pixels in the frame use the same DC offset, or individually at the sub-pixel position level. Computation and assignment of DC offset values may be based on DC frame and block differences between a reference unit and a current unit to be encoded. Computation can be performed on an "a priori" basis before motion estimation is performed for the current unit to be encoded. By analyzing DC frame and block difference between the current unit and reference unit, offsets can be applied before encoding the current unit, when no motion vector information is available, permitting single pass encoding.

Some video encoders, such as encoders constructed to perform according to the H.264 standard, can predict a frame from multiple, previously encoded and transmitted frames. These reference frames are typically stored in one or in two lists, and each list can contain several frames, indexed by an integer positive number. In general, the frame indexed by zero (one in each list if two lists are used) is the one temporally closer to the current frame. The sub-pixel offsets determined with a procedure as described in this disclosure are generally used only on the reference frames closest to the current frame (the ones indexed by index zero). On all the other frames, a simple DC offset may be used independently of the sub-pixel position. This offset can be computed as the difference in luminosity between the reference frame and the current frame, and applied across the current frame.

A refined motion estimation process can be applied to take into account DC offsets previously added to the sub-pixel positions, and force evaluation of sub-pixel positions that have non-zero DC offsets in the motion search. Predictive motion estimation can reduce the complexity of the motion search by predicting locations that are more likely to correspond to a block to be coded, and by structuring the search into patterns. However, a predictive motion estimation process may skip the testing of some sub-pixel positions to which DC offset values have been assigned. This limitation may be overcome by providing a motion search that explicitly searches sub-pixel positions with defined DC offsets during estimation of distortion. In this manner, the motion search may be configured to require that sub-pixel positions that have non-zero offsets are explicitly searched.

In addition, the motion search may be configured to calculate virtual block DC offsets. For example, the SAD error computed during the motion search may take into account all possible offsets. The motion search compares (computes the SAD error between) blocks before applying the offset. It may be possible to improve performance by feeding to the motion search the offsets that have been calculated so that the motion search can be used to take into account this possibility. For example, if the algorithm has determined that the sub-pixel offsets should be used for the respective positions as shown in Table 1 below:

TABLE 1

| Position | Offset |
|---|---|
| 0 | 0 |
| 1 | 2 |
| 2 | 0 |
| 3 | 0 |
| 4 | 0 |
| 5 | 3 |
| 6 | 1 |
| 7 | -2 |
| 8 | 0 |
| 9 | 3 |
| 10 | 0 |
| 11 | 2 |
| 12 | 0 |
| 13 | -1 |
| 14 | 1 |
| 15 | 1 | then the computation of the SAD for two blocks may be computed six times, each time after adding to the reference block one of the "virtual" offsets {-2, -1, 0, 1, 2, 3}. The motion vector having the smallest SAD may be selected. Offset values appearing in more than one position (offset "2," for example, appearing both in sub-pixel position 1 and 11) may be only tried once. That is, a motion estimation unit may search only one of a plurality of sub-pixels each having the same calculated offset value.

FIG. 1 is a block diagram illustrating an example video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices, including wired and wireless devices. In some cases, source device 12 and destination device 16 may comprise wireless communication devices, such as wireless handsets, so-called cellular or satellite radiotelephones, or any wireless devices that can communicate video information over a communication channel 15, in which case communication channel 15 includes a wireless communication medium.

In the example of FIG. 1, source device 12 may include a video source 18, a video encoder 20, a modulator/demodulator (modem) 22, and a transmitter 24. Destination device 16 may include a receiver 26, a modem 28, a video decoder 30, and a display device 32. Video encoder 20 of source device 12 may be configured to apply one or more coding techniques described in this disclosure as part of a video encoding process. Similarly, video decoder 30 of destination device 16 may be configured to apply one or more coding techniques described in this disclosure as part of a video decoding process.

Encoding techniques described in this disclosure may be performed by any encoding device that supports motion compensated interpolation to sub-pixel resolution. In the example of FIG. 1, source device 12 generates coded video data for transmission to destination device 16. Devices 12, 16 may operate in a substantially symmetrical manner such that each of devices 12, 16 include video encoding and decoding components. Hence, system 10 may support one-way or two-way video transmission between video devices 12, 16, e.g., for video streaming, video playback, video broadcasting, or video telephony.

Video source 18 of source device 12 may include a video capture device, such as a video camera, a video archive containing previously captured video, or a video feed from a video content provider. As a further alternative, video source 18 may generate computer graphics-based data as the source video, or a combination of live video, archived video, and computer-generated video. In some cases, if video source 18 is a video camera, source device 12 and destination device 16 may form so-called camera phones or video phones. In each case, the captured, pre-captured or computer-generated video may be encoded by video encoder 20. The encoded video data may be modulated by modem 22 according to a communication standard, and transmitted to destination device 16 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 28 demodulates the information. The video decoding process performed by video decoder 30 may make use of interpolation filters, offset values, motion vectors and residual information to decode and reproduce video data received from device 12. For example, the information communicated over channel 15 may include offset information defined by video encoder 20 for particular frames, slices and blocks. Display device 32 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 20 and video decoder 30 may operate according to a video compression standard, such as the ITU-T H.264 standard, alternatively described as MPEG-4, Part 10, Advanced Video Coding (AVC). The techniques of this disclosure, however, are not limited to any particular coding standard. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work extensions to H.264/MPEG-4 AVC.

Video encoder 20 and video decoder 30 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 20 operates on video blocks within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process.

Smaller video blocks can provide better resolution, and may be used for locations of a video unit that include high levels of detail. In general, macroblocks and the various sub-blocks may be considered to be video blocks. In addition, a slice or frame may be considered a video unit comprising a series of video blocks, such as macroblocks and/or sub-blocks. Each frame may be an independently decodable unit of a video sequence, and each slice may be an independently decodable unit of a video frame. The term "coded unit" refers to any independently decodable unit such as an entire frame, a slice of a frame, or another independently decodable unit defined according to applicable coding techniques.

Following predictive coding, and following any transforms, such as the 4×4 or 8×8 integer transform used in H.264/AVC or a discrete cosine transform (DCT), quantization may be performed. Quantization generally refers to a process in which coefficients are quantized to reduce the amount of data used to represent the coefficients. The quantization process may reduce the bit depth associated with some or all of the coefficients. For example, a 16-bit value may be rounded down to a 15-bit value during quantization. Following quantization, entropy coding may be performed, e.g., according to content adaptive variable length coding (CAVLC), context adaptive binary arithmetic coding (CABAC), or another entropy coding process.

According to the techniques of this disclosure, video encoder 20 may encode a video unit in a single pass using interpolation filters and offset values. Hence, in some cases, encoding the block may comprise performing motion estimation for the block only once such that encoding is performed in a single pass. In one example, video encoder 20 may include a set of interpolation filters with fixed coefficients. That is, the set of interpolation filters need not necessarily include an adaptive filter, for which an encoder would dynamically determine the coefficients. Instead, encoder 20 may select an interpolation filter for each sub-pixel position from a plurality of alternative, fixed interpolation filters.

Different interpolation filters may be selected for interpolation of different sub-pixel positions. Each sub-integer pixel position may have a default interpolation filter and a plurality of other interpolation filters that may be selected to interpolate the respective sub-integer pixel position based on historical interpolation results. Video encoder 20 may encode a first inter-coded video unit, e.g., a macroblock of a first P-frame, by first calculating the sub-integer pixel values of a reference unit using the default interpolation filters for the respective sub-integer pixel positions.

Once the sub-integer pixel values in the reference unit are interpolated, video encoder 20 may utilize both the integer and fractional, sub-pixel positions of the reference unit to calculate a motion vector for the macroblock of the next P-frame being encoded. In particular, video encoder 20 may search for blocks in the previously coded reference unit that most closely match respective blocks in the current unit being coded, e.g., based on pixel difference calculations such as sum of absolute difference (SAD), sum of square difference (SSD), or the like.

After having generated motion vectors for each macroblock of a first P-unit to be coded relative to predictive blocks in a reference unit, video encoder 20 may determine an error value for each macroblock of the first P-unit based on, for example, a pixel value difference between the predictive macroblock (i.e., the reference macroblock of the reference unit) and the actual macroblock of the P-unit. As described above, the error value may comprise, for example, a sum of absolute difference (SAD) or a sum of squared difference (SSD) value.

Video encoder 20 may then determine whether a different set of interpolation filters would have resulted in a lower error value. In particular, video encoder 20 may identify the interpolation filters, for respective sub-pixel positions, that would have resulted in the lowest error value by recalculating the values of the sub-integer pixel values of the reference macroblock and computing the error value for the recalculated macroblock identified by the motion vector. Video encoder 20 may then determine which interpolation filters would have provided the lowest absolute error value or the lowest average error value for the unit for each sub-integer pixel position.

In this manner, video encoder 20 may select interpolation filters to interpolate the sub-integer pixel positions of the reference unit used for the current unit based on the interpolation filters that would have produced the optimal results for the reference unit. In some examples, video encoder 20 may further calculate accumulated error values for each interpolation filter at each sub-integer pixel position over a series of code units. Video encoder 20 may use accumulated error values to select the interpolation filters that provide historically optimal values for sub-integer pixel positions.

Video encoder 20 may identify which of the interpolation filters yielded the lowest error value for the previous frame or over a series of previous frames. The error value may be tracked for each interpolation filter and each sub-pixel position over a series of frames. Each sub-pixel position may be calculated with a respective interpolation filter. A plurality of interpolation filters may be available for selection for each sub-pixel position. A set of interpolation filters may be selected to support interpolation of multiple, respective sub-pixel positions.

In one example, before video encoder 20 encodes a next predictive unit, such as a P-frame or a B-frame, video encoder 20 calculates the values of the sub-integer pixels of the previously encoded unit using the interpolation filters that would have resulted in the lowest error value for the reference unit (or units) of the previously encoded unit. Likewise, for each subsequent inter-coded frame, video encoder 20 may identify which of the interpolation filters would have resulted in the lowest error value for the reference unit thereof and applies those interpolation filters to the most recently encoded unit to calculate values for sub-integer pixels of the most recently encoded unit, which will then be used as the reference frame for motion estimation.

In some cases, video encoder 20 may identify which of the interpolation filters have the lowest historical accumulated interpolation error value for each sub-pixel position over a series of coded units. By tracking the error value produced for each sub-pixel position by each of the plurality of interpolation filters, an interpolation filter that produced the lowest error value may be selected for each respective sub-pixel position for interpolation to support motion estimation for the next frame to be coded. In this manner, video encoder 20 can select interpolation filters for sub-pixel positions based on historical interpolation results for previously coded frames. The historical interpolation results analyzed by video encoder 20 may take into account interpolation error for several units or, in some cases, only the interpolation error for a single unit. In particular, video encoder 20 may analyze cumulative error results over multiple frames or simply the interpolation error between the reference unit (e.g., N−1) for the current unit N and the previous reference unit N−2.

As an illustration, if there are n sub-pixel positions to be interpolated, and m different interpolation filters that could be chosen to interpolate each of the n sub-pixel positions, video encoder 20 may compute n×m different error values. Each error value may represent the error value for a given one of the n sub-pixel position value computed according to a given one of the m interpolation filters, relative to actual pixel values in the previous unit to be coded. On a block basis, the error value may be based on the pixel value difference between pixel values for a block to be coded and the pixel value of a sub-pixel position in an interpolated, predictive block generated using a given set of interpolation filters. The interpolation filter for a sub-pixel position may be applied for all corresponding sub-pixel positions across the frame. Similarly, the error value for each interpolation filter and sub-pixel position may be provided across the frame. For example, the error value may be an average or median value or a summed value for a given frame.

As mentioned above, the error value for each sub-pixel position and interpolation filter may be accumulated over a series of units, producing a cumulative error value for each combination of interpolation filter and sub-pixel position. In some cases, the error values over a series of units may be summed using a weighted summation, with error values for more recently coded frames being weighted more heavily than frames coded previously relative to the current frame to be coded.

As an example, a sliding window may be used such that, for a unit to be coded, the cumulative error value sums weighted error values from the first unit in the window to the last unit in the window, just prior to the unit to be coded, where the error values for the earlier unit are weighted with smaller weighting coefficients than the error values for the later units. The weighting coefficients may increase progressively from the earlier coded units to the lower coded units. In addition, the accumulated error may be periodically scaled down to prevent overflow. The error values for less recently coded units may be eventually phased out as they fall outside the window.

To select a particular interpolation filter for a particular sub-pixel position to code a current unit, video encoder 20 may evaluate the weighted summation of error values for that interpolation filter and sub-pixel position over a range of previously coded units. The interpolation filter that yields the lowest accumulated error for a given sub-pixel position may then be selected as the interpolation filter to be used for interpolation of that sub-pixel position for the next unit to be coded.

The selected interpolation filter for a given sub-pixel position may be used as the interpolation filter for all pixels at corresponding sub-pixel positions in blocks across the coding unit. In particular, the selected filter is used to interpolate that sub-pixel position in the reference unit to support the motion search for the next unit to be coded. If there are n sub-pixel positions in each block, then encoder 20 may select a set of n different interpolation filters for the respective sub-pixel positions. The same set of interpolation filters can be used for sub-pixel positions in each block of the unit.

Following interpolation, and prior to motion estimation, video encoder 20 may also apply offset values to the pixel values at the interpolated sub-pixel positions. Video encoder 20 may calculate a plurality of offset values for a coded unit of the video data, such as a frame or an independently decodable portion of a frame such as a slice. The different offset values may be associated with a plurality of different integer and sub-integer pixel locations associated with video blocks. The sub-integer pixel locations may define locations of interpolated or extrapolated data, which typically is interpolated, as described above, based on the data at the integer pixel locations. Video encoder 20 may apply the offset values to integer pixel positions and sub-pixel positions in predictive video blocks to generate offset predictive video blocks, and encode video blocks of the coded unit based on the offset predictive video blocks.

Video encoder 20 may also encode the offset values as part of a coded bitstream that includes the coded video blocks of the coded unit, and transmitter 24 of source device 12 may transmit the coded bitstream to receiver 26 of destination device 16. In particular, video encoder 20 may apply offset values by adjusting pixel values of predictive video blocks, and may encode video blocks based on the offset predictive video blocks by generating residuals based on the offset predictive video blocks. For example, residuals may be generated by subtracting a block to be coded from the appropriate offset predictive video block. Since offset is added to the pixel values of the offset predictive video block based on location of the predictive video block, coding efficiency may be improved, e.g., during flashes or background lighting changes.

When performing a motion search for a unit to be coded, video encoder 20 identifies predictive blocks in a reference coding unit. In some cases, a motion search algorithm may be configured to skip certain sub-pixel values. In particular, some, predictive motion estimation may reduces the complexity of the motion search by predicting locations that are more likely to correspond to a block to be coded, and by structuring the search into patterns. However, a predictive motion estimation process may skip the testing of some sub-pixel positions to which DC offset values have been assigned. Video encoder 20 may be configured to overcome this limitation in predictive motion estimation process by imposing a requirement that the motion search explicitly search sub-pixel positions having non-zero offset values.

In destination device 16, video decoder 30 receives identifiers of the interpolation filters used to encode the video data and the plurality of offset values for each coded unit of the video data. For example, these identifiers may be coded by video encoder 20 as syntax elements in unit headers, such as frame headers or slice headers, provided in a coded bitstream. Video decoder 30 may store parameters for the same set of interpolation filters as video encoder 20. Video decoder 30 applies the interpolation filters identified by video encoder 20 to calculate the values of sub-integer pixels for predictive video blocks, applies the offset values to the predictive video blocks to generate offset predictive video blocks, and decodes video blocks of the coded unit based on the offset predictive video blocks.

In particular, using motion vectors and interpolation filters, video decoder 30 can obtain predictive blocks for respective blocks in a unit to be decoded, and sum residual information with the predictive blocks to reproduce the desired blocks in the decoded unit. In this way, the interpolation filters and offset values are defined and applied at video encoder 20 as part of the encoding process, and then information identifying the interpolation filters and offset values is communicated from source device 12 to destination device 16 as part of an encoded bitstream. The offset values are then applied to the interpolated predictive data at video decoder 30 as part of the decoding process in order to reconstruct the pixel values of a video unit.

Figure 2:
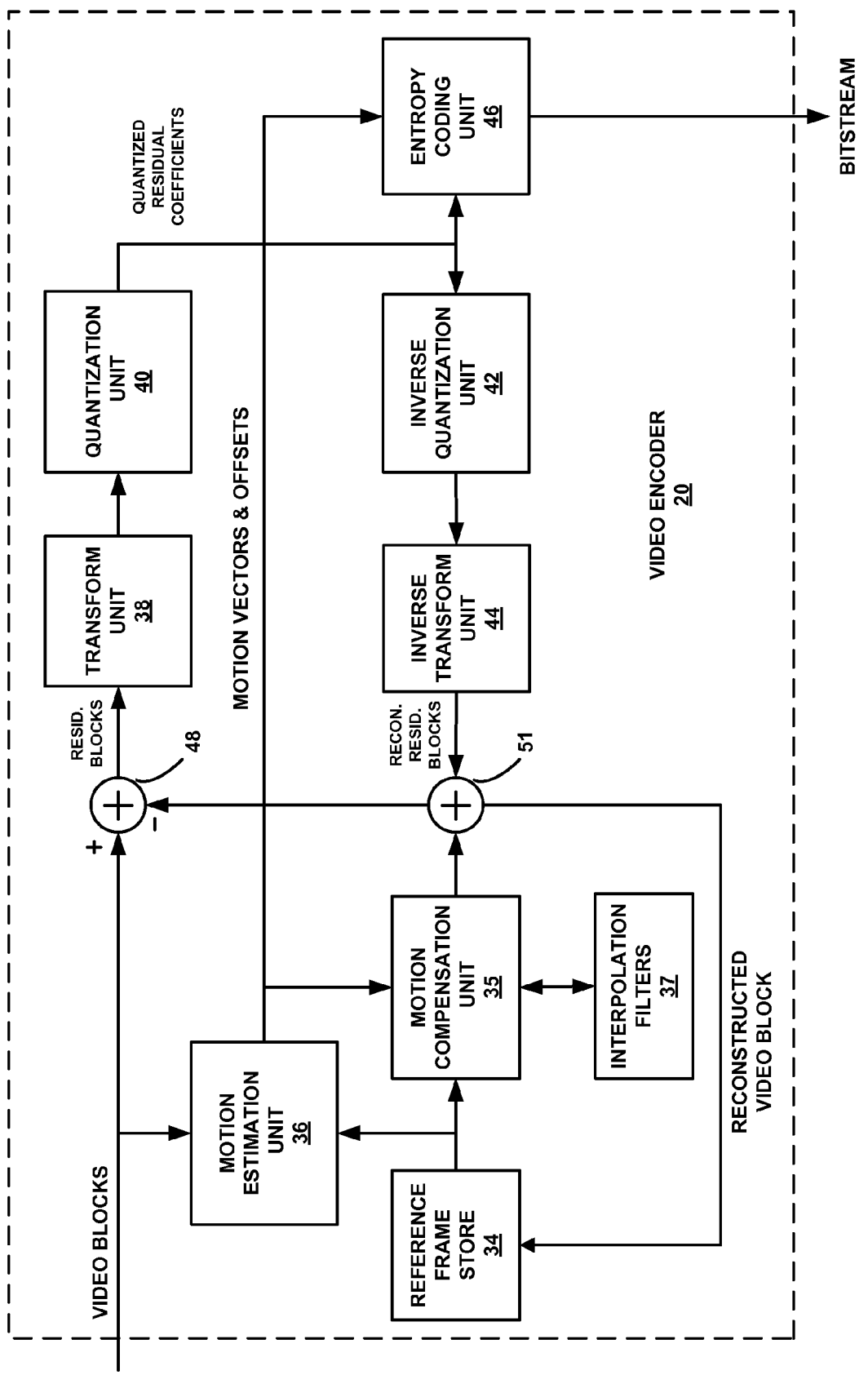
FIG. 2 is a block diagram illustrating an example of a video encoder configured to perform video encoding with interpolation and offsets.

FIG. 2 is a block diagram illustrating an example of a video encoder 20 that may apply interpolation and offset techniques as described in this disclosure. encoder 20 Video encoder 20 may perform intra- and inter-coding of blocks within video units, such as frames or slices. For ease of illustration, however, intra-coding components of video encoder 20 are not shown in detail in FIG. 2. Intra-coding relies on spatial prediction to reduce or remove spatial redundancy in video within a given video unit. Inter-coding relies on temporal prediction to reduce or remove temporal redundancy in video within adjacent units, such as frames, of a video sequence. Intra-mode (I-mode) may refer to the spatial based compression mode and inter-modes such as prediction (P-mode) or bi-directional (B-mode) may refer to the temporal-based compression modes. The techniques of this disclosure can be applied during inter-encoding by video encoder 20.

As shown in FIG. 2, video encoder 20 receives a current video block within a video frame to be encoded. In the example of FIG. 2, video encoder 20 includes motion estimation unit 36, a motion compensation unit 35, a reference frame store 34, an adder 48, a transform unit 38, a quantization unit 40, and an entropy coding unit 46. For video block reconstruction, video encoder 20 also includes an inverse quantization unit 42, an inverse transform unit 44, and adder 51. A deblocking filter (not shown) may also be included to filter block boundaries to remove blockiness artifacts from reconstructed video. If desired, the deblocking filter may filter the output of adder 51.

During the encoding process, video encoder 20 receives a video block to be coded, and motion estimation unit 36 and motion compensation unit 35 perform inter-predictive coding. Motion estimation unit 36 and motion compensation unit 35 may be highly integrated, but are illustrated separately for conceptual purposes. Motion estimation is typically considered the process of generating motion vectors, which estimate motion for video blocks, and result in identification of corresponding predictive blocks in a reference unit. A motion vector, for example, may indicate the displacement of a predictive block within a predictive frame (or other coded unit) relative to the current block being coded within the current frame (or other coded unit). Motion compensation is typically considered the process of fetching or generating the predictive block based on the motion vector determined by motion estimation. Again, motion estimation unit 36 and motion compensation unit 35 may be functionally integrated. For demonstrative purposes, motion compensation unit 35 is described as performing the selection of interpolation filters and the offset techniques of this disclosure.

Coding units in the form of frames will be described for purposes of illustration. However, other coding units such as slices may be used. Motion estimation unit 36 calculates a motion vector for the video block of an inter-coded frame by comparing the video block to video blocks of a reference frame in reference frame store 34. Motion compensation unit 35 selects one of a plurality interpolation filters 37 to apply to calculate pixel values at each of a plurality of sub-pixel position in a previously encoded frame, e.g., an I-frame or a P-frame. That is, video encoder 20 may select an interpolation filter for each sub-pixel position in a block.

The selected interpolation filters may be different for different sub-pixel positions. The set of interpolation filters applied to different sub-pixel positions in a block may be the same for all blocks in the reference frame. For example, if interpolation filter F1 is selected for sub-pixel position x1, y1 in a block, the same interpolation filter F1 may be used for that same sub-pixel position in all blocks in the same frame. Sub-pixel positions alternatively may be referred to as sub-integer pixels, sub-pixels or sub-pels.

Motion compensation unit 35 may select the interpolation filter from interpolation filters 37 based on an interpolation error history of one or more previously encoded frames. In particular, after a frame has been encoded by transform unit 38 and quantization unit 40, inverse quantization unit 42 and inverse transform unit 44 decode the previously encoded frame. In one example, motion compensation unit 35 applies the selected interpolation filters 37 to the previously encoded frame to calculate values for the sub-integer pixels of the frame, forming a reference frame that is stored in reference frame store 34.

For a subsequent frame, motion compensation unit 35 may apply a different set of interpolation filters 37 to calculate sub-integer pixel values for the subsequent frame. The selection of the different interpolation filters may be based on a history of the frames previously encoded, such as an accumulated error for each of the interpolation filters at the given sub-pixel positions, such that motion compensation unit 35 selects the interpolation filters 37 with the lowest cumulative error values for the respective sub-pixel positions over a series of frames. The error values may be based on the difference between actual pixel values in a given frame and interpolated pixel values in a reference frame.

Interpolation filters 37 may comprise a plurality of interpolation filters. Each potential sub-integer pixel position may be mapped to one of the set of interpolation filters 37 for calculation of a corresponding pixel value. For example, motion compensation unit 35 may apply a 6-tap Wiener filter with coefficients [1, −5, 20, 20, −5, 1] to calculate values of half-pixel positions based on values of integer pixel positions, and a bilinear filter to calculate values of quarter-pixel positions based on values of integer pixel positions. In one example, for half-pixel positions, the 6-tap Wiener filter may comprise a default filter to apply for half-pixel positions and the bilinear filter may comprise a default filter to apply for quarter-pixel positions.

In addition, each pixel position may be mapped to alternative interpolation filters, e.g., interpolation filters with different coefficients. Other interpolation filters may be constructed using various coefficients. In general, fixed interpolation filters can be different in their coefficients (different coefficients specify different frequency response) and/or in their support (whether this is one or two dimensional, vertical, horizontal, or diagonal), or in the number of taps (and so pixels) used to interpolate. Bigger supports may typically perform better, but have higher complexity in terms of multiplications and additions that need to be performed to interpolate a pixel.

In one example, each sub-integer pixel may be mapped to m possible different interpolation filters, where at least some of the m interpolation filters for one sub-integer pixel position may be different than the m interpolation filters for a different sub-integer pixel position. For quarter-pixel precision, interpolation filters 37 may comprise m*15 unique interpolation filters, where m is the number of interpolation filters per sub-pixel. Alternatively, some sub-integer pixels may be mapped to the same interpolation filter. At least one of the interpolation filters for each sub-integer pixel may be assigned as a default interpolation filter for the corresponding sub-integer pixel. The default interpolation filter may be used initially in a video sequence, e.g., before sufficient historical interpolation results have been accumulated to permit reliable selection of interpolation filters.

Motion estimation unit 36 compares blocks of a reference frame from reference frame store 34 to a block to be encoded of a current frame, e.g., a P-frame or a B-frame. Because the reference frames in reference frame store 34 include interpolated values for sub-integer pixels, a motion vector calculated by motion estimation unit 36 may refer to a sub-integer pixel location. Motion estimation unit 36 sends the calculated motion vector to entropy coding unit 46 and motion compensation unit 35. In accordance with the techniques described in this disclosure, motion estimation unit 36 may calculate one motion vector per block, and generate the motion vector based on interpolation filters and offsets selected prior to motion estimation. In this manner, video encoder 20 can encode units such as frames, slices and blocks in a single pass, i.e., without performing motion estimation twice for a video block of the coded unit.

Encoding in a single pass is in contrast to a multi-pass encoding process involving selecting initial interpolation filters and offsets, encoding the video using the initial interpolation filters and offsets, selecting new interpolation filters and offsets based on the encoding results, and then re-encoding the frame with the newly selected interpolation filters and offsets. Instead, encoder 20 selects interpolation filters based on historical interpolation results for one or more previous frames, selects offsets based on differences between the current frame and one or more previous frames, and then performs motion estimation using the selected interpolation filters and offsets to produce a motion vector and residual information for each block. Accordingly, video encoder 20 does not need to recalculate the motion vector in a second or subsequent pass, and can thereby improve efficiency of the encoding process. Instead, motion estimation can be performed once. Motion compensation unit 35 calculates error values between predictive blocks of the reference frame and actual blocks of the frame being encoded, and produces residual block values, via adder 48, that are encoded by transform unit 38 and quantization unit 40 of video encoder 20.

In one example, as discussed above, motion compensation unit 35 may determine which of interpolation filters 37 would have resulted in the lowest error for blocks of a previously encoded reference frame. For example, after encoding the reference frame using a selection set of interpolation filters for motion estimation, motion compensation unit 35 may identify which of interpolation filters 37 would have resulted in the lowest error value at each of the sub-pixel positions. To do so, motion compensation unit 35 may recalculate the sub-integer pixels of predictive video blocks generated to encode the reference frame using different sets of interpolation filters. In particular, when a motion vector calculated by motion estimation unit 36 references sub-integer pixel locations of a block of a reference frame in reference frame store 34, motion compensation unit 35 recalculates the values of the sub-integer pixels of the block using other interpolation filters 37. Motion compensation unit 35 then calculates error values corresponding to each of interpolation filters 37 for the predictive block.

Motion compensation unit 35 determines which of interpolation filters 37 results in the lowest error value for the frame that was encoded. Even though the frame was already encoded using a set of interpolation filters, interpolation filters that would have produced the lowest interpolation error value can be determined after encoding and used to perform motion estimation for the next frame to be encoded. After encoding a frame and identifying a set of interpolation filters 37 that would have resulted in the lowest error for the frame, motion compensation unit 35 may apply the selected interpolation filters to the reconstructed frame before storing the frame in reference frame store 34. In this manner, motion compensation unit 35 may use the set of interpolation filters 37 that is determined to be optimal for previous frame to calculate sub-integer pixel values in a reference frame that can be used for motion estimation to encode the next frame to be coded.

In another example, as discussed above, motion compensation unit 35 accumulates error values for each of interpolation filters 37 at each sub-pixel position and, for a new frame to be stored in reference frame store 34, motion compensation unit 35 selects interpolation filters 37 with the lowest accumulated error for the respective sub-pixel positions. In this manner, motion compensation unit 35 may accumulate, for each filter and each sub-pixel position, the interpolation error between the previously encoded frames and their references. As mentioned above, Motion compensation unit 35 may periodically scale down the accumulated errors of interpolation filters 37, to prevent memory overflow and to weight recent use of interpolation filters 37 more heavily than older, historical use of the interpolation filters. In this manner, motion compensation unit may introduce a "window" effect that weights the contribution of the most recent frames more and "forgets" the oldest.

Interpolation error may be calculated based on the difference between original pixel values of a frame to be encoded and pixel values of a predictive frame produced by interpolation. The predictive frame may include predictive blocks that are produced by interpolation and correspond to blocks to be coded in the frame to be coded. The difference may be calculated as a difference in pixel values among the predictive blocks and coded blocks, e.g., as determined by SSD, SAD or other difference metrics. The different metrics may be summed or averaged across blocks in a frame to compute overall difference values, and difference values at each sub-pixel position. A set of interpolation filters that would have produced the lowest difference values at each of the sub-pixel positions for a previously coded reference frame may be selected as the set of interpolation filters used for motion estimation for the next frame to be coded with respect to the reference frame. Alternatively, interpolation filters producing the lowest cumulative difference values at respective sub-pixel positions over a range of coded video frames may be used for motion estimation for the next frame to be coded with respect to the reference frame.

In general, motion compensation unit 35 may select an interpolation filter for each sub-integer pixel location by calculating a decision vector D. D may be a vector of length n, where n corresponds to the number of sub-integer pixel locations for each pixel. In one example, where video encoder 20 supports quarter-pixel precision, n equals 15. Each element of D corresponds to one of the interpolation filters for the corresponding sub-integer pixel position. Thus, if each sub-integer pixel has m different possible interpolation filters, each element of D ranges between 0 and m. For a first reference frame, each element of D may be initialized to "0," where "0" refers to a default interpolation filter for the corresponding pixel position. Motion compensation unit 35 may calculate each sub-pixel position value of the first reference frame using the corresponding default interpolation filter for the respective sub-pixel position.

Motion estimation unit 36 may calculate motion vectors for each coded unit of a subsequently inter-coded frame by referring to a reference frame for which motion compensation unit 35 has calculated sub-integer pixel values using interpolation filters as identified by decision vector D. Motion compensation unit 35 may also calculate a cost matrix C for the inter-coded frame. In one example, for a predictive coded frame, the cost matrix C includes a first dimension F corresponding to the interpolation filters for each sub-integer pixel and a second dimension I that corresponds to the sub-integer pixels. Thus the cost matrix may be defined as C[F][I], where F=[0, m] and I=[0, n]. Each element of C is initially set to 0.

Then, motion compensation unit 35 calculates, for each pixel of an inter-coded frame and each interpolation filter of the pixel, where f is in F and i is in I, C[f][i]+=|actual(i)−predicted(i,f)|, where actual(i) is the actual value of the pixel corresponding to sub-pixel i in the pixel of the frame to be inter-coded and where predicted(i,f) is the value of sub-pixel i as calculated using interpolation filter f referred to by a corresponding motion vector, e.g., in an example using SAD calculations. Thus, each element of C corresponds to the cumulative error for a corresponding sub-pixel location using a corresponding interpolation filter for that sub-pixel.

A similar cost matrix $C_2$[F1][F2][i][j] can be calculated for bi-predicted frames, where i refers to the sub-pixel of F1, j refers to the sub-pixel of F2, F1 refers to the interpolation filter used to calculate sub-pixel position i in the first reference frame, and F2 refers to the interpolation filter used to calculate sub-pixel position j in the second reference frame. Motion compensation unit 35 may then compute error values between the inter-coded frame and the reference frame, e.g., as a SAD value. To compute the SAD value from the cost matrix C, motion compensation unit 35 may calculate the sum of the cumulative error value for each applied sub-pixel location with the filter that was used to calculate that sub-pixel, according to the following formula:

$$SAD = \sum_{m=0}^{n} C[D[m]][m]$$

Motion compensation unit 35 may iteratively proceed through the cost matrix to determine a position, and an interpolation filter corresponding to that position, such that the combination of position and filter would result in the biggest reduction to the error value between the inter-coded frame and the reference frame. That is, motion compensation unit 35 may identify a value C[f][p] that results in the biggest reduction to the SAD value calculated above. Motion compensation unit 35 may then change the decision vector such that the determined interpolation filter f will be used in the future for the determined sub-integer pixel position p. In particular, for decision vector D, sub-integer pixel position p, and interpolation filter f, motion compensation unit 35 may perform D[p]=f. Motion compensation unit 35 may then recalculate the difference, e.g., SAD, as if filter f had been used to calculate sub-integer pixel values at position p using the formula presented above.

Motion compensation unit 35 may repeat this process until either the difference is not changed substantially (e.g., any difference is less than a minimum threshold) or until a maximum number of iterations have been performed. The following pseudocode summarizes the process described above:

```
void computeDecisionVector(D, referenceFrame, currentFrame) {
    D[0, ..., n−1] = {0, 0, 0, ..., 0};
    calculateCostMatrix(C, referenceFrame, currentFrame);
    SAD = ComputeSAD (D, C);
    threshold_exceeded = TRUE;
    while (iterations < Max_Iterations AND threshold_exceeded) {
        (P, F) = FindPosition(D, C, SAD);
        D[P] = F;
        if (ComputeSAD(D, C) > Threshold)
            SAD = ComputeSAD(D, C);
        else
            threshold_exceeded = FALSE;
    }
}
```

In some examples, motion compensation unit 35 may accumulate error for each reference frame, favoring the most recent reference frames and "forgetting" the older reference frames. To do so, motion compensation unit 35 may calculate a cost matrix for a particular frame as discussed above, but further add to that cost matrix a fractional weighting of the value an earlier cost matrix for a previously coded frame. For example, for cost matrix C of the previously coded frame and cost matrix $C_{REF}$ of its reference frame, motion compensation unit 35 may calculate $C=C+(1/n)*C_{REF}$. In this case, n may preferably be any integer greater than one. In this manner, motion compensation unit 35 may avoid overflow, prefer cost calculations for newer reference frames in selecting interpolation filters, and "forget" or phase out calculations for older reference frames, i.e., reference frames that are more temporally distant from the frame to be encoded.

As a further illustration, if a frame N is to be coded, and frames N−1 through N-M have already been coded, the interpolation filters selected for motion estimation for frame N, e.g., with respect to reference frame N−1, may be selected according to a cost equation computed as follows:

$$C = a_1 C_{N-1} + a_2 C_{N-2} + a_3 C_{N-3} + \ldots + a_M C_{N-M}$$

where coefficients $a_1, a_2, \ldots a_M$ represent weighting coefficients that have progressively smaller values. Based on the accumulated cost C for each interpolation filter at a given sub-pixel position, encoder 20 selects the interpolation filter that produces the lowest value of C.

Motion compensation unit 35 may also add offset values, such as DC offsets, to the interpolated predictive data, i.e., sub-integer pixel values of a reference frame in reference frame store 34. Motion compensation unit 35 may assign the DC offsets based on the DC difference between a reference frame and a current frame or between a block of the reference frame and a block of the current frame. Motion compensation unit 35 may assign DC offsets "a priori," i.e., before a motion search is performed for the current frame to be encoded, consistent with the ability to perform coding in a single pass.

Pixel values of predictive video blocks may be offset upward or downward according to the offset associated with integer or non-integer pixel locations of the predictive video blocks. The interpolations performed by motion compensation unit 35 may define interpolated data at several possible sub-integer pixel locations for different video block. Rather than define a single offset value for a given coded unit, motion compensation unit 35 may define, in some implementations different offset values for each possible integer and sub-integer pixel location. In other cases, a single offset value may be applied to all pixel values in a predictive block, slice or frame. Motion compensation unit 35, in some examples, applies offset values to only a subset of the sub-integer pixels. Prediction data can then apply location-specific offset based on the pixel location associated with the prediction data.

In one example, motion compensation unit 35 may calculate a first set of metrics (e.g., mean values) respectively associated with each integer and sub-integer pixel location for video blocks of the coded frame that are to be encoded based on the predictive video blocks. Motion compensation unit 35 may also calculate a second set of metrics (e.g., mean values) respectively associated with each integer and sub-integer pixel location for the predictive video blocks that will be used to encode the blocks of the current frame. That is, the first set of metrics is defined by the data being coded, and the second set of metrics is defined by the predictive data in the reference frame used for predictive coding. Motion compensation unit 35 then calculates the plurality of offset values based on the first and second sets of metrics.

The first set of metrics may comprise a first set of mean values associated respectively with each integer and sub-integer pixel location of video blocks of the coded unit that are coded based on the predictive video blocks, and the second set of metrics may comprise a second set of mean values respectively associated with each integer and sub-integer pixel location for the predictive video blocks. In this case, the plurality of offset values may comprise differences between the first set of mean values and the second set of mean values. In this way, several different offset values may be defined for several different integer and sub-integer pixel locations based on actual data coded in a first coding pass. The differences may represent, for example, a difference in illumination between the frames.

The first set of metrics may comprise a set of mean values that correspond to the mean of pixel values at each integer and sub-integer pixel location of video blocks of a given coded unit. The second set of metrics may comprise a set of mean values that correspond to the mean of pixel values at each integer and sub-integer pixel location of predictive blocks used to predict the current blocks that are being coded in that coded unit. The plurality of offset values may comprise differences between the first set of mean values and the second set of mean values. Each macroblock location may be defined by a single pixel, e.g., the respective pixel in the upper left-hand corner of the respective macroblock. However, each macroblock may define sixteen pixel values that contribute to a particular mean value in the first set of mean values. The techniques of this disclosure, of course, may also apply to other sized video blocks.

The offset technique of this disclosure may apply with respect to luma blocks, chroma blocks or both. Different offsets may be defined for each integer and sub-integer pixel location associated with each type of video block (e.g., luma and chroma blocks). Furthermore, different offsets could be assigned to each block at each particular size, partition or sub-partition of each block. In some examples, for inter-encoding a bi-predicted block, two offsets may be calculated for a particular pixel or sub-integer pixel location, the first offset representing an average difference between a current block of the current frame and the co-located block of the temporally closer reference frame (i.e., list 0) and the second offset representing an average difference between the current frame and the temporally more distant reference frame (i.e., list 1). After calculating the two offset values, video encoder 20 may determine which of the two offset values to apply to the pixel or sub-integer pixel value, when encoding based on list 0, applying the first offset, and when encoding based on list 1, applying the second offset.

Computing block-based DC offsets involves collecting statistics (in the form of a histogram) on the DC difference among co-located blocks of a certain size (for example, 16×16 pixels) of a current frame and a reference frame. Blocks in the reference frame and in the current frame are compared and, for each co-located block of the two frames, two quantities are computed:

1) The squared error of the pixel differences (err0 described below with respect to the example functions blockDC1 and blockDC2); and
2) The squared error of the pixel differences after the average DC of the block is subtracted to the value of each pixel (err1 described below with respect to the example functions blockDC1 and blockDC2).

By comparing these two quantities (for example, by checking if the error in 1 is greater than twice the error in 2), it may be possible to estimate whether the blocks are sufficiently similar (i.e., whether the difference between the co-located blocks is mostly caused by a DC difference) and, if this is the case, accumulate the statistics into a vector containing the histogram of the block-based DC differences. For practical reasons, DC differences can be quantized, for example, by rounding them to integer values.

By inspecting the histogram bins, it is possible to derive a range of DC differences and compute DCmin and DCmax. Some possibilities are the following:

1) Count the number of bins corresponding to positive and negative DC values having more than noSamples samples (method used in function blockDC2 below);

2) Count the number of bins corresponding to negative and positive DC values having more than noSamples samples, but stop counting the first time the test fails; or 3) Find the DC value corresponding to the leftmost and the rightmost bins containing more than noSamples samples (method used in blockDC1 below).

As an example, if noSamples=20 and the histogram is as indicated below in Table 2, the first method will return DCmin=−2, DCmax=2, the second DCmin=−2, DCmax=1, and the third DCmin=−2, DCmax=4.

TABLE 2

| Samples | DC Diff |
|---------|---------|
| 0 | −4 |
| 10 | −3 |
| 80 | −2 |
| 130 | −1 |
| 1000 | 0 |
| 150 | 1 |
| 0 | 2 |
| 0 | 3 |
| 25 | 4 |

Once the block-based DC difference value between the current and the reference frame have been estimated as outlined above, offsets are assigned to a subset of sub-pixel positions. The mechanism used is known to both the encoder and decoder and fully determined by the values of DCmin and DCmax. Therefore, unless it is necessary to maintain compatibility with other methods, the transmission of the offsets can be greatly simplified by transmitting only these two values.

Offsets O(1) to O(15) may be assigned to sub-pixel positions in a predetermined order: 5, 15, 13, 7, 9, 6, 11, 14, 1, 4, 3, 12, 10, 2, 8. Other orders of assignment are possible. Table 3 below shows the indexing of the sub-pixel positions used in ¼ pixel interpolation (position 0 is associated to the full-pixel) and the assignment of the offsets. If less than 15 offsets are being assigned, the remaining values are set to zero. The method may be extended to a different fractional pixel interpolation. An example of application of DC offsets to these sub-pixel positions is discussed with respect to the example of FIG. 5.

TABLE 3

| 0 | 1 | 2 | 3 | | O(9) | O(14) | O(11) | | O(9) | 0 | 0 |
|---|---|---|---|---|------|-------|-------|---|------|---|---|
| 4 | 5 | 6 | 7 | O(10) | O(1) | O(6) | O(4) | 0 | O(1) | O(6) | O(4) |
| 8 | 9 | 10 | 11 | O(15) | O(5) | O(13) | O(7) | 0 | O(5) | 0 | O(7) |
| 12 | 13 | 14 | 15 | O(12) | O(3) | O(8) | O(2) | 0 | O(3) | O(8) | O(2) |

In Table 3 above, the left four columns indicate sub-pixel positions, the center four columns indicate assignment of 15 offsets, and the right four columns illustrate assignment of 9 offsets.

The (frame-based) DC difference between the current and the reference frame can be used to determine both the threshold noSamples used in the computation of DCmin and DCmax and the number of offsets for ¼ pixel interpolation. The threshold noSamples can also be computed by taking into account the size of the image (and so the number of blocks). Then, DCmin and DCmax can be further refined. A possible way of achieving this is exemplified by the following pseudocode:

```
sign = (DCdiff >= 0)? 1: −1; // if DCdiff >= 0, sign = +1, else sign = −1
noOffsets = (int)(abs(DCdiff) + 0.5);
DCint = noOffsets * sign;
blockDC(list, &DCmin, &DCmax, 32 − 16 * (noOffsets >= 2));
DCmax = max(DCint, DCmax);
DCmin = min(DCint, DCmin);
roundFact = (int)ceil((double)(DCmax − DCmin) / 15.0);
roundFact = max(roundFact, 1);
DCmin = −roundFact * (int)(abs(DCmin) / roundFact + 0.5);
DCmax = roundFact * (int)(abs(DCmax) / roundFact + 0.5);
```

The quantity roundFact in the above pseudocode is used to quantize the DC range and constrain the offsets to no more than 15 values. Then, offsets in the range [DCmin, DCmax] are assigned to the sub-pixel positions in the order specified above. If the absolute value of frame-based DC difference is small (for example, smaller than 2), then the DC difference is re-quantized with a smaller step (0.1, for example) and a new quantity, called noOffsets1 is created. If noOffsets1 is smaller than or equal to a threshold (8, for example), then the first noOffset1 sub-pixel positions (first in the order specified above) are set to zero and the remaining positions are filled up with +1 or −1 (depending on the sign of the DC difference). If noOffset1 is greater than the threshold, then the first noOffsets1 positions are filled up with +1 or −1 and the remaining sub-pixel positions are set to zero.

With further reference to FIG. 2, motion compensation unit 35 calculates prediction data based on the predictive block. Video encoder 20 forms a residual video block by subtracting the prediction data from the original video block being coded. Adder 48 represents the component or components that perform this subtraction operation. Transform unit 38 applies a transform, such as a discrete cosine transform (DCT) or a conceptually similar transform, to the residual block, producing a video block comprising residual transform block coefficients. Transform unit 38, for example, may perform other transforms, such as those defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 quantizes the residual transform coefficients to further reduce bit rate. The quantization process may reduce the bit depth associated with some or all of the coefficients. For example, a 16-bit value may be rounded down to a 15-bit value during quantization. Following quantization, entropy coding unit 46 entropy codes the quantized transform coefficients. For example, entropy coding unit 46 may perform content adaptive variable length coding (CAVLC), context adaptive binary arithmetic coding (CABAC), or another entropy coding methodology. Following the entropy coding by entropy coding unit 46, the encoded video may be transmitted to another device or archived for later transmission or retrieval. The coded bitstream may include entropy coded residual blocks, motion vectors for such blocks, identifiers of interpolation filters to apply to a reference frame to calculate sub-integer pixel values for a particular frame, and other syntax including the offset values that identify the plurality of different offsets at different integer and sub-integer pixel locations within the coded unit.

Inverse quantization unit 42 and inverse transform unit 44 apply inverse quantization and inverse transformation, respectively, to reconstruct the residual block in the pixel domain, e.g., for later use as a reference block. Motion compensation unit 35 may calculate a reference block by adding the residual block to a predictive block of one of the frames of reference frame store 34. Motion compensation unit 35 may also apply the selected interpolation filters 37 to the reconstructed residual block to calculate sub-integer pixel values. Summer 51 adds the reconstructed residual block to the motion compensated prediction block produced by motion compensation unit 35 to produce a reconstructed video block for storage in reference frame store 34. The reconstructed video block may be used by motion estimation unit 36 and motion compensation unit 35 as a reference block to inter-code a block in a subsequent video frame.

Motion estimation unit 36 may also modify a standard search algorithm used to identify a predictive block from which to calculate a motion vector, according to the techniques of this disclosure. In accordance with the techniques of this disclosure, motion estimation unit 36 may perform an improved motion search that takes into account the DC offsets previously added to the reference frame. In particular, motion estimation unit 36 may refine the motion search by forcing evaluation of sub-pixel positions that have non-zero DC offset values as a result of the addition of the DC offsets. During the motion search, motion estimation unit 36 attempts to identify a predictive block of a reference frame that most closely matches a block to be encoded, e.g., based on a SAD, SSD or other pixel difference metric for the block.

To improve encoding resulting from the motion search, motion estimation unit 36 may examine predictive blocks of the reference frame beginning at an integer or sub-integer pixel location for which motion compensation unit 35 has defined a non-zero offset value, even if a standard motion search algorithm would prescribe skipping a block starting at one of these pixel locations. When a block of the reference frame begins at a pixel or sub-pixel location for which there is no defined offset value, or an offset value of zero, and a motion search algorithm prescribes skipping the block at that location, motion estimation unit 36 may skip the location and move to a next pixel location. However, when a block of the reference frame begins at a location for which motion compensation unit 35 has defined a non-zero offset value, and the motion search algorithm prescribes skipping the block at that location, motion estimation unit 36 may nevertheless analyze the block starting at that location, thus overriding the standard motion search algorithm. In particular, motion estimation unit 36 may compare the block starting at that location in the reference frame to the block to be coded to determine whether the block should be selected as the predictive block for inter-coding.

In one example, video encoder 20 may combine a procedure to select interpolation filters based on a history (single or cumulative) of one or more previously encoded frames, a procedure to compute and assign DC offsets to sub-pixel positions, and a refinement of the motion search to take into account sub-pixel positions with DC offsets, to perform encoding in a single pass with little or no loss of performance and a considerable speed gain. In other examples, video encoder 20 may perform any combination or permutation of (1) the procedure to select the interpolation filters, (2) the procedure to compute and assign DC offsets to sub-pixel positions, and (3) the improvement to the motion search to take into account sub-pixel positions with DC offsets.

Figure 3:
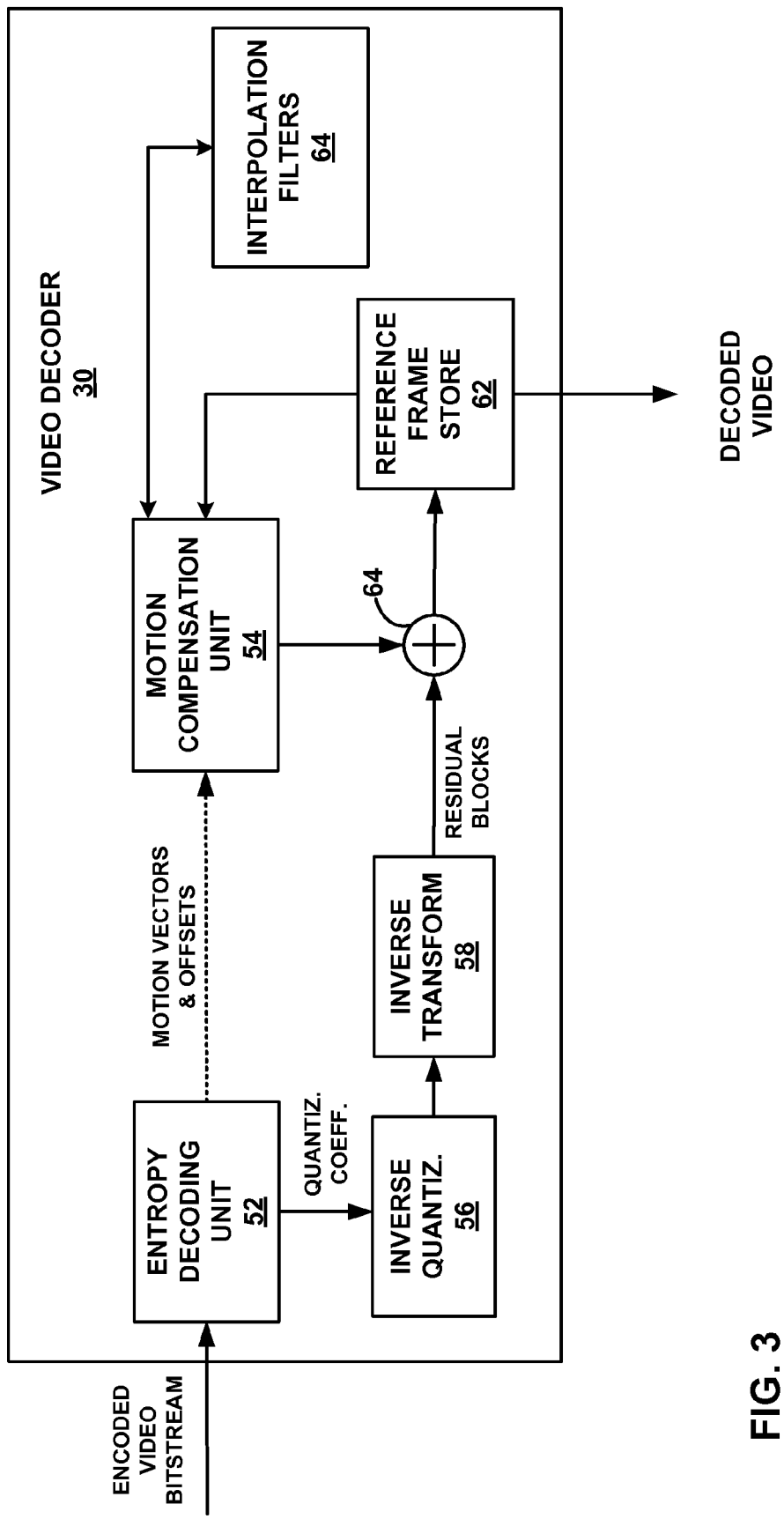
FIG. 3 is a block diagram illustrating an example of a video decoder configured to decoded video data encoded by the encoder of FIG. 2.

FIG. 3 is a block diagram illustrating an example of a video decoder 30, which decodes a video sequence that is encoded in the manner described in this disclosure. Video decoder 30 may, in some examples, perform a decoding pass reciprocal to the encoding described with respect to video encoder 20 (FIG. 2). Video decoder 30 includes a motion compensation unit 54 that performs the offset techniques of this disclosure during the decoding. In particular, on the decoding side, motion compensation unit 54 may receive a syntax element from entropy decoding unit 52 that identifies a plurality of offset values for the coded unit, e.g., defining different offsets for integer pixel locations and one or more non-integer pixel locations.

Motion compensation unit 54 may generate prediction data based on motion vectors received from entropy decoding unit 52. In particular, motion compensation unit 54 may identify predictive blocks in a previously decoded reference frame using the motion vectors, and may add appropriate offset to such prediction data (based on pixel location of the prediction data) to generate offset prediction data. The prediction data may be interpolated data, in which case a corresponding one of the offset values for a non-integer location may be applied to interpolated prediction data to generate the offset prediction data. Based on this offset prediction data, the video data (e.g., a reconstructed residual video block) can be decoded. In particular the decoder may combine the offset prediction data with the residual video block to generate the originally video block that was encoded.

Entropy decoding unit 52 entropy decodes the received bitstream to generate quantized coefficients and the syntax (e.g., motion vectors and a plurality of offset values for the coded unit). The syntax is forwarded from entropy coding unit 52 to motion compensation unit 54. Inverse quantization unit 56 inverse quantizes, i.e., de-quantizes, the quantized block coefficients. The inverse quantization process may be a conventional process, e.g., as defined by H.264 decoding. Inverse transform unit 58 applies an inverse transform, e.g., an inverse DCT or conceptually similar inverse transform process, to the transform coefficients in order to produce residual blocks in the pixel domain. Motion compensation unit 54 produces motion compensated blocks, possibly performing interpolation using interpolation filters 64. Identifiers specifying particular interpolation filters 64 to be used for sub-pixel positions in particular frames may also be included as syntax elements in the bitstream generated by encoder 20.

Motion compensation unit 54 may select the same set of interpolation filters 64 as used by video encoder 20 during encoding of the video block. In particular, motion compensation unit 54 calculates sub-integer pixel values using the set of interpolation filters 64, as indicated by syntax elements in the bitstream for a reference block retrieved from reference frame store 62. After motion compensation unit 54 generates the predictive blocks based on the motion vectors, motion compensation unit 54 adds the appropriate offset values to the predictive blocks to generate the offset predictive blocks that were used in the original encoding performed by the encoder.

Summer 64 adds residual data from the residual blocks by summing the residual blocks with the corresponding offset prediction blocks generated by motion compensation unit 54 to form decoded blocks for the current frame. If desired, a deblocking filter may also be applied to filter the decoded blocks in order to remove blockiness artifacts. The decoded video blocks are then stored in reference frame store 62, which provides reference blocks for subsequent motion compensation for later frames to be decoded and also produces decoded video for transmission to a display buffer to drive a display device (such as device 28 of FIG. 1) for presentation of the video.

Again, the techniques of this disclosure concern the application of offset to motion compensated predictive data, in which the different offsets are used for integer and different sub-integer pixel locations defined by interpolation. The encoder uses the techniques of this disclosure to define and apply the different offset values, and the decoder interprets syntax elements sent from the encoder in order to identify that same offset values defined and used by the encoder. The appropriate offset is applied to pixel values of predictive data, and the appropriate offset is selected based on the pixel location defined for such predictive data, e.g., an integer pixel location or one of several possible non-integer pixel locations.

Figure 4:
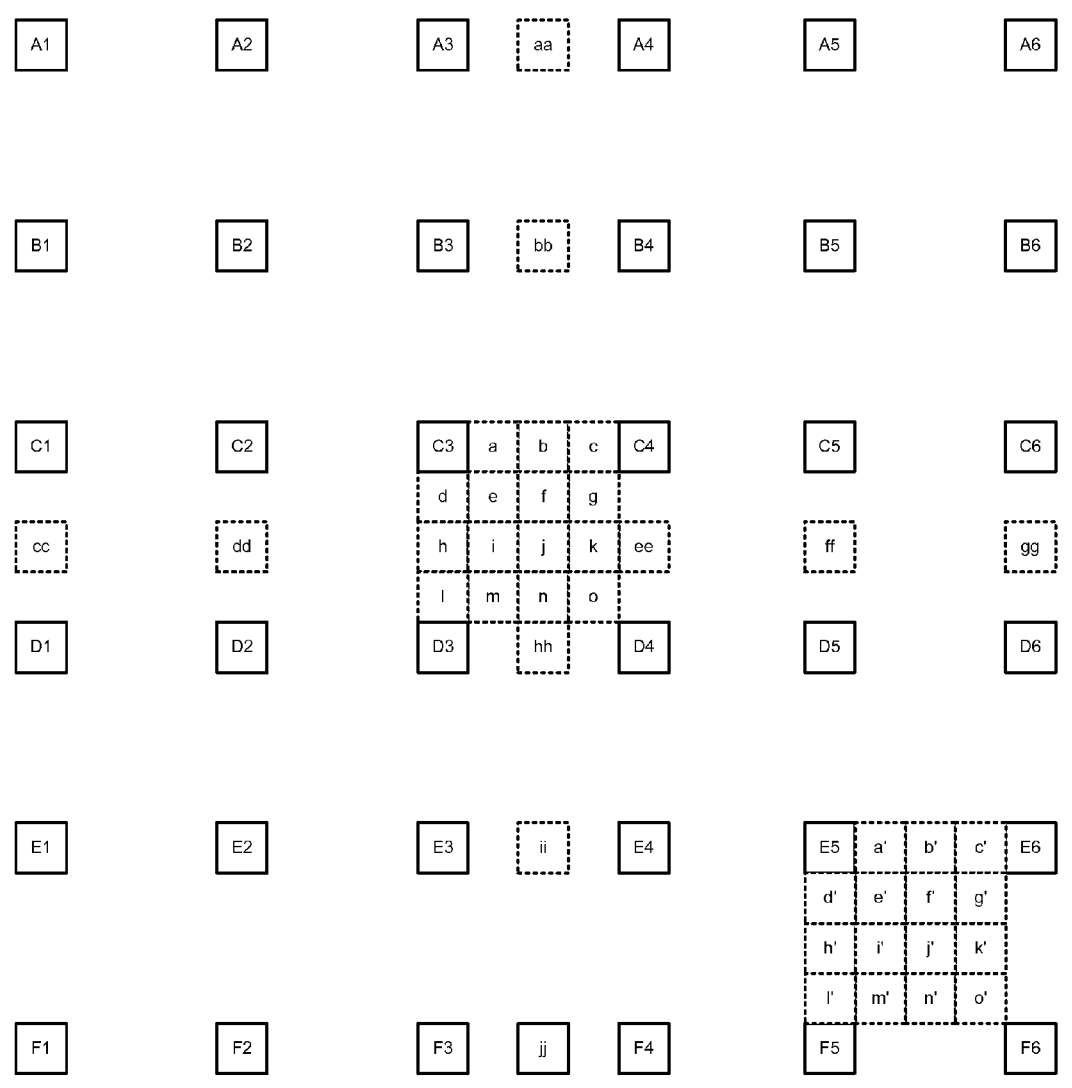

FIG. 4 is a conceptual diagram illustrating integer pixel locations associated with predictive data, and sub-integer pixel locations associated with interpolated predictive data. In the conceptual illustration of FIG. 4, the different boxes represent pixels. Capitalized letters (in the boxes with solid lines) represent integer pixel locations, while small letters (in the boxes with dotted lines) represent the sub-integer interpolated pixel locations. Pixel locations "aa," "bb," "cc," "dd," "ee," "ff," "gg," "hh," "ii," and "jj," are half-pixel locations used in the fractional interpolations of various fractional locations associated with pixel location "C3." Each pixel may correspond to an upper right-hand pixel of a video block such that that pixel defines the video block. For interpolation or extrapolation, each of the pixels of a video block may be interpolated or extrapolated the same way with respect to different integer pixels that have the same spatial distance from the respective sub-integer pixels.

Every integer pixel location has an associated 15 different fractional ("sub-integer") locations. In the example of FIG. 4, these 15 different fractional locations associated with pixel "C3" are illustrated as sub-integer pixel locations "a," "b," "c," "d," "e," "f," "g," "h," "i," "j," "k," "l," "m," "n," and "o." Similarly, 15 different fractional locations associated with pixel "E5" are illustrated as sub-integer pixel locations "a'," "b'," "c'," "d'," "e'," "f'," "g'," "h'," "i'," "j'," "k'," "l'," "m'," "n'," and "o'." Most of the other fractional locations are not shown for simplicity (other than those mentioned above, which are used to generate one or more of the 15 different fractional locations associated with pixel "C3").

In the ITU H.264/AVC standard, for example, in order to obtain luma signals at half-pixel positions, a 6-tap Wiener filter with coefficients [1, −5, 20, 20, −5, 1] is typically used. Then, in order to obtain luma signals at quarter-pixel locations, a bilinear filter is used. The bilinear filter may also be used in fractional pixel interpolation for the chroma components, which may have up to ⅛-pixel precision in H.264/AVC.

After motion estimation, the best motion vector for a given video block may be identified, e.g., using a rate-distortion model in order to balance the coding rate and video quality. The prediction video block is formed during motion compensation using the best motion vector. As outlined above, the residual video block is formed by subtracting the prediction video block from the original video block. A transform is then applied on the residual block, and the transform coefficients are quantized and entropy coded to further reduce bit rate.

The techniques of this disclosure include adding offset to the predictive video blocks. The value of the offset may be location-specific in that different offsets are defined for different integer and sub-integer pixel locations. The offset associated with video blocks identified by pixels "b" and "b'" may be the same since these two pixels define the same sub-integer pixel location with respect to integer pixels C3 and E5. However, the offset associated with video blocks identified by pixels "c" and "d'" may be different since pixels "c" and "d'" define different sub-integer pixel locations with respect to integer pixels C3 and E5. Each of the sixteen different pixel locations "C3," "a," "b," "c," "d," "e," "f," "g," "h," "i," "j," "k," "l," "m," "n," and "o" may define different offsets. Moreover, these different offsets may also apply respectively to each of the sixteen different pixel locations "E5," "a'," "b'," "c'," "d'," "e'," "f'," "g'," "h'," "i'," "j'," "k'," "l'," "m'," "n'," and "o'." The offsets may define a signed value that essentially biases every pixel value of the predictive block upward or downward to generate an offset predictive block.

The offsets may be referred to as DC offsets, since they may comprise an average difference of all pixels of the coded unit that have the same sample location (integer or particular sub-integer location) relative to the mean of all corresponding predictive pixels. That is, because each of the pixels of a block are biased in the same way and by the same degree, the offset results in a change of the DC value of the transformed data resulting from, e.g., a DCT calculation, where the DC value is the upper-left value of the matrix resulting from the transform calculation. This is because the DC value represents an average of the pixel values of a block. Therefore, by biasing the pixels by a particular value, the DC value resulting from the transform calculation will be biased in a similar way. Accordingly, in some examples, the DC offset may be applied to the DC value resulting from the transform calculation, rather than applying the DC offset to each pixel of the block.

In some examples, each of the integer and sub-integer pixel location may be assigned a different offset value. The offset value corresponding to the pixel or sub-pixel referenced by the motion vector is applied to each pixel of a block. As one example, for the pixel locations "e," "f," "g," "i," "k," "m," "n," and "o," the offset values {1, 6, 4, 5, 7, 3, 8, 2} may be respectively assigned, to assign offset values ranging between 1 and 8 to the pixel and sub-pixel locations. That is, the offset value mapping may be {C3->null, a->null, b->null, c->null, d->null, e->1, f->6, g->4, h->null, i->5, j->null, k->7, l->null, m->3, n->8, o->2}. In another example, the offset value may comprise a difference between the average value of pixels of a reference frame and the average value of pixels of a current frame. Referring to such a difference as DCframe, in one example, when 0<DCframe<1.5, offsets with a magnitude of 1 are assigned to 10*DCframe (rounded to the nearest integer) pixel positions. For example, where DCframe equals 0.83, eight of the sixteen pixel locations are assigned an offset with a magnitude of 1.

In accordance with the techniques of this disclosure, motion estimation unit 36 may also evaluate blocks with locations for which there exist defined offset values, even when a standard motion search algorithm would prescribe skipping one or more of these blocks. Motion estimation unit 36 may skip evaluating blocks starting at pixel locations without defined offset values when the motion search algorithm prescribes skipping those blocks. In the example above, where the offset values {1, 6, 4, 5, 7, 3, 8, 2} are respectively assigned to pixel locations "e," "f," "g," "i," "k," "m," "n," and "o,", motion estimation unit 36 may skip evaluating blocks starting at pixel locations "C3," "a," "b," "c," "d," "h," "j," and "l" when the motion search algorithm so prescribes skipping these pixel locations. However, motion estimation unit 36 would evaluate blocks starting at pixel locations "e," "f," "g," "i," "k," m," "n," and "o" even when the motion search algorithm prescribes skipping blocks starting at these locations, because pixel locations "e," "f," "g," "i," "k," m," "n," and "o" have defined offset values.

As another example, let DCmb represent the difference between the average value of the pixels of a reference block and the average value of the pixels of the current block. Further, let DCmin be the smallest value of DCmb assigned to at least a threshold number of macroblocks, and let DCmax be the largest value of DCmb assigned to at least the threshold number of macroblocks. In one example, when DCframe>1.5, each of the pixel values is assigned an offset value ranging between DCmin and DCmax.

Again, FIG. 4 shows the integer-pixel samples (also called full-pixels) in the solid boxes with upper-case letters. For any given integer-pixel sample, there may be 15 sub-pixel positions, which are shown for integer-pixel sample "C3" and labeled "a" through "o" in FIG. 4. In accordance with H.264/AVC, motion compensation unit 35 may calculate the half-pixel positions "b," "h," and "j" first using a one-dimensional 6-tap Wiener filter. The interpolation filter may be applied first in the horizontal direction and then in the vertical direction, or vice versa. Motion compensation unit 35 may then filter the remaining quarter-pixel positions using the bilinear filter and the already calculated half-pixel samples.

The actual filters applied to generate interpolated data may be subject to a wide variety of implementations. As one example, motion compensation unit 35 may use adaptive interpolation filtering to define the interpolated values. In another example, several sets of interpolation filters may be applied and the set that yields the best predictive data may be selected. In some examples, interpolation filters may be selected based on historical interpolation data for one or more reference frames, as described in this disclosure. The addition of offset, per this disclosure, occurs after generating any interpolated predictive data from the reference frame to be used in the coding, but before motion estimation is performed for the current frame to be coded.

Motion compensation unit 35 may use a switched interpolation filter with offset (SIFO) scheme, as described with respect to FIG. 2. Motion compensation unit 35 may choose between a plurality fixed interpolation filters 37, e.g., which may be respectively defined by plurality of different pre-defined sets of interpolation filter coefficients. The choice of the interpolation filter may be performed for each coded unit level (e.g., frame level or slice level) or for each sub-pixel position (sample level). Furthermore, according to this disclosure, DC offsets may also be added after prediction, and the DC offsets may also be defined for each possible integer or fractional pixel location as described in this disclosure.

Thus, motion compensation unit 35 may use different sets of fixed interpolation filters 37 in order to define several possible alternatives of interpolation data. As examples, motion compensation unit 35 may use a standard ITU-T H.264 filter set, a filter set based on H.264/AVC but with higher precision (without intermediate rounding for ½-pixel positions and biased rounding for ¼-pixel positions) or a set of customized interpolation filters. The set of customized interpolation filters may be pre-defined by using a set of training video sequences.

The filter set that offers the best prediction (i.e., the smaller prediction error energy) can be chosen by motion compensation unit 35, as indicated by historical interpolation error for the previous reference frame or multiple reference frames on a cumulative basis, and applied to generate the interpolated data. When multiple reference frames are used, different filter sets may be selected for different reference frames. In one example, motion compensation unit 35 may apply standard filters for the ½-pixel positions (positions b, h and l), and motion compensation unit 35 may apply a customized filter set for the other ¼-pixel positions.

Once the predictive data is generated or interpolated by motion compensation unit 35, DC offset can be applied to the predictive data based on the sample location associated with the interpolated (or non-interpolated) data. In particular, this disclosure provides the use of different DC offsets for different integer or sub-integer pixel locations. Again, in the example data shown in FIG. 4, this means that each of the sixteen different pixel locations "C3," "a," "b," "c," "d," "e," "f," "g," "h," "i," "j," "k," "l," "m," "n," and "o" may define its own, different offset. Hence, for sixteen possible integer and sub-integer locations, there may be sixteen different offsets. Moreover, these different offsets may also apply respectively to each of the sixteen different pixel locations "E5," "a'," "b'," "c'," "d'," "e'," "f'," "g'," "h'," "i'," "j'," "k'," "l'," "m'," "n'," and "o'."

Adding DC offsets to the pixels of prediction data may help to capture effects of illumination changes between different video frames. Illumination changes may be caused by such things as flashes or a darkening sky in a video sequence. H.264/AVC uses weighted prediction, which may allow offsets to be added to the prediction pixel value. However, the DC offsets defined by H.264/AVC weighted prediction may only be allowed on a frame level, meaning that only one offset value is defined for a given frame regardless of whether prediction data of a video block is interpolated or not. In other words, for frame level offset, all pixels in the same frame have the same DC offset.

In accordance with this disclosure, in some cases, DC offset may be defined differently for different sample positions associated with interpolated and non-interpolated data. Thus, different DC offsets may be defined for each of the 15 sub-pixel positions shown in FIG. 4 ("a," "b," "c," "d," "e," "f," "g," "h," "i," "j," "k," "l," "m," "n," and "o") and another DC offset may be defined for integer-pixel positions. When sample-based DC offsets are used, a total of 16 DC offsets may be coded and sent as syntax elements in the video bitstream for the decoder. By applying sample-based DC offsets, motion compensation unit 35 may provide a simple but effective motion segmentation tool.

As an example, a video frame may contain a darkening sky as still background and a moving object as the foreground. In this case, the background and the foreground may have different degrees of illumination changes, and by using location-specific DC offset values defined by the location of the pixel that identifies a given video block, motion compensation unit 35 may be able to capture the different degrees of illumination changes in the foreground and the background in a more efficient manner than could be achieved without such location-specific DC offset values.

Furthermore, when video blocks of a coded unit use multiple different reference frames, e.g., for bi-directional prediction, different DC offsets may be calculated and sent for each integer and sub-integer location associated with the different reference frames. In some cases, some reference frames may comprise a single frame-based DC offset, while other reference frames may have several location-specific DC offsets. Some schemes may use location-specific DC offsets only with respect to the reference frame that is closest in temporal distance to the current frame being coded, and may use a single frame-based DC offset for all of the other reference frames.

In order to code the DC offsets, 1 bit per frame may be used to indicate whether a single frame-based DC offset is used or whether several location-specific DC offsets are used. If the DC offsets have only integer precision, the values of these offsets may be coded using a signed exponential-Golomb code. If the DC offsets have fractional precision, the values of the integer offset may be coded using a signed exponential-Golomb code, and the values of non-integer offsets may be coded using residual differences relative to the integer offset defined by the signed exponential-Golomb code.

On the decoder side, the decoder may simply apply the appropriate DC offset values to the pixels of any generated predictive video blocks. The DC offset value used by the decoder may be defined in a syntax element for the specific integer or sub-integer pixel location associated with each predictive video block. For example, a syntax element in a header of a coded unit may include flags or values to specify each of the plurality of offset values for that coded unit. The terms "offset" and "DC offset" are used interchangeably in this disclosure. The offset is referred to as DC offset insofar as an overall offset is defined for each same respective pixel location, e.g., one offset for the integer location and several different offsets for each possible sub-pixel location.

In accordance with the techniques of this disclosure, offsets may be applied to integer and sub-integer pixel positions in a single encoding pass. In one example, a method for assigning DC offset values in a single pass may include the following operations:

a. Compute DCDiff[idx], the DC difference between the reference frame "idx" and the current frame
b. Set sgn=sign(DCDiff[idx]), where sign( ) returns either +1 or −1
c. If the reference frame has idx>0, set formOffset [idx]=min(round(DCDiff[idx]), 1) and return, else:
d. Determine numOffsets as min(round(DCDiff[idx]), 8);
e. If numOffsets>=numOffsetsMin (e.g., where numOffsetsMin=2), add in sequence a number of offsets, equal to numOffsets, of increasing value {1, 2, 3, 4, 5, 6, 7, 8} to the sub-pixel positions {5, 15, 13, 7, 9, 6, 11, 14};
f. Otherwise, calculate numOffsets1 as min(round(DCDiff[idx]/0.1), 15)
g. If numOffsets1>0 and numOffsets1<=thFullPel0, add a number of offsets, equal to numOffsets1, of value sgn to the sub-pixel positions following the order {5, 15, 13, 7, 9, 6, 11, 14}
h. Otherwise, if numOffsets1>0, add eight offsets of value sgn to the sub-pixel positions {0, 1, 2, 3, 4, 8, 10, 12} and add a number of offsets, equal to numOffsets1, of value sgn, to the sub-pixel positions following the order {14, 11, 6, 9, 7, 13, 15, 5}

In some examples, by using a process as outlined above, motion compensation unit 35 may assign offset values to integer and sub-integer pixel locations in a single pass. Motion compensation unit 35 may then apply the offset value of a particular integer or sub-integer pixel location, as identified by a motion vector calculated by motion estimation unit 36, to a predictive block.

In some examples, motion compensation unit 35 calculates a DC difference between two frames to determine an offset value to assign to a particular sub-integer pixel. Motion compensation unit 35 may collect statistics in the form of a histogram regarding a DC difference between a block of a current frame and the co-located block of a reference frame for the current frame. Motion compensation unit 35 may first calculate a squared error of the pixel difference between the block of the current frame and the co-located block of the reference frame as a first error value. Motion compensation unit 35 may also calculate an average DC difference between the two blocks and subtract the calculated DC difference from the pixel values of the block of the current frame, then compare the squared error of the differences between pixels of the block of the current frame after subtracting the average DC difference and the pixels of the co-located block of the reference frame as a second error value.

Motion compensation unit 35 may determine whether the first error value or the second error value is better, e.g., by checking whether the first error value is greater than twice the second error value. Motion compensation unit 35 may determine whether the block of the current frame and the co-located block of the reference frame are sufficiently similar based on this comparison. When motion compensation unit 35 determines that the two blocks are sufficiently similar, motion compensation unit 35 may accumulate the error values in a vector containing a histogram of the block based DC differences.

Motion compensation unit 35 may analyze bins of the histogram in a variety of ways to compute values such as a $DC_{min}$ value and a $DC_{max}$ value, based on a number of samples collected for the histogram. In one example, for a minimum number of samples "noSamples," motion compensation unit 35 may determine that the $DC_{min}$ value is equal to −1 times a count of the number bins corresponding to negative DCs having more than noSamples samples and that the $DC_{max}$ value is equal to a count of the number bins corresponding to positive DCs having more than noSamples samples. In another example, for a minimum number of samples "noSamples," motion compensation unit 35 may determine that the $DC_{min}$ value is equal to −1 times a count of the number of bins corresponding to negative DCs having more than noSamples samples (where the counting begins at DC diff value 0), but motion compensation unit 35 is configured to stop counting after the first time the test fails, and that the $DC_{max}$ value is equal to the a count of the number of bins corresponding to positive DCs having more than noSamples samples, but motion compensation unit 35 is configured to stop counting after the first time the test fails. In another example, for a minimum number of samples "noSamples," motion compensation unit 35 may determine that the $DC_{min}$ value is equal to the DC corresponding to the leftmost bin containing more than noSamples samples and that the $DC_{max}$ value is equal to the DC corresponding to the rightmost bin containing more than noSamples samples. Table 4 below is identical to Table 2 above but is reproduced below for ease of illustration.

TABLE 4

| Samples | DC Diff |
|---------|---------|
| 0       | −4      |
| 10      | −3      |
| 80      | −2      |
| 130     | −1      |
| 1000    | 0       |
| 150     | 1       |
| 0       | 2       |
| 0       | 3       |
| 25      | 4       |

To further illustrate these example methods, assuming that noSamples=20 and that the histogram is as indicated in Table 4 above, motion compensation unit 35 may determine that $DC_{min}$=−2 and $DC_{max}$=2 for the first example method, that $DC_{min}$=−2 and $DC_{max}$=1 for the second example method, and that $DC_{min}$=−2 and $DC_{max}$=4 for the third example method.

After calculating $DC_{min}$ and $DC_{max}$, motion compensation unit 35 may assign DC offset values to sub-integer pixels. In one example, motion compensation unit 35 assigns offsets O(1) to O(15) to sub-integer pixels in the order 15, 13, 7, 9, 6, 11, 14, 1, 4, 3, 12, 10, 2, 8 (i.e., sub-pixel indexes 15, 13, 7, etc.), although other orders of assignment are possible. In some examples, motion compensation unit 35 may not calculate the total number of possible offset values, in which case motion compensation unit 35 may assign the calculated offsets according to the order presented above.

Motion compensation unit 35 may use a frame-based DC difference between a current frame and a reference frame to determine a threshold noSamples used in the calculation of $DC_{min}$ and $DC_{max}$. Motion compensation unit 35 may also calculate the threshold noSamples value according to the size of an image, based on a number of blocks in the image. In one example, motion compensation unit 35 determines that the number of offset values to assign is equal to the DC difference between the two frames plus 0.5.

In some examples, motion compensation unit 35 may further refine the DC offset values assigned by determining, when the calculated number of offset values is greater than the calculated value of $DC_{max}$, to use the calculated number of offset values as $DC_{max}$, or when the calculated number of offset values is less than the calculated value of $DC_{min}$, to use the calculated number of offset values as $DC_{min}$. Otherwise, motion compensation unit 35 may use the originally calculated values of $DC_{max}$ and/or $DC_{min}$.

Motion compensation unit 35 may calculate a value, "roundFact," that has as a minimum value 1, and that is equal to the difference between the value of $DC_{max}$ and $DC_{min}$ divided by the number of sub-integer pixel positions, e.g., 15, the difference being rounded to the next highest integer value. Motion compensation unit 35 may further refine the values of $DC_{max}$ and/or $DC_{min}$ by calculating:

$$DCmin = -roundFact * \frac{|DCmin|}{roundFact + 0.5},$$

and $$DCmax = roundFact * \frac{|DCmax|}{roundFact + 0.5}$$

The following pseudocode represents the example method for refining $DC_{max}$ and $DC_{min}$ as discussed above, where blockDC calculates the initial values of $DC_{min}$ and $DC_{max}$ using one of the example methods also discussed above, and the pseudocode following blockDC refine the values of $DC_{min}$ and $DC_{max}$:

```
sign = (DCdiff >= 0)? 1: -1;
noOffsets = (int)(abs(DCdiff) + 0.5);
DCint = noOffsets * sign;
blockDC(list, &DCmin, &DCmax, 32 - 16 * (noOffsets >= 2));
DCmax = max(DCint, DCmax);
DCmin = min(DCint, DCmin);
roundFact = (int)ceil((double)(DCmax - DCmin) / 15.0);
roundFact = max(roundFact, 1);
DCmin = -roundFact * (int)(abs(DCmin) / roundFact + 0.5);
DCmax = roundFact * (int)(abs(DCmax) / roundFact + 0.5)
```

Figure 5:
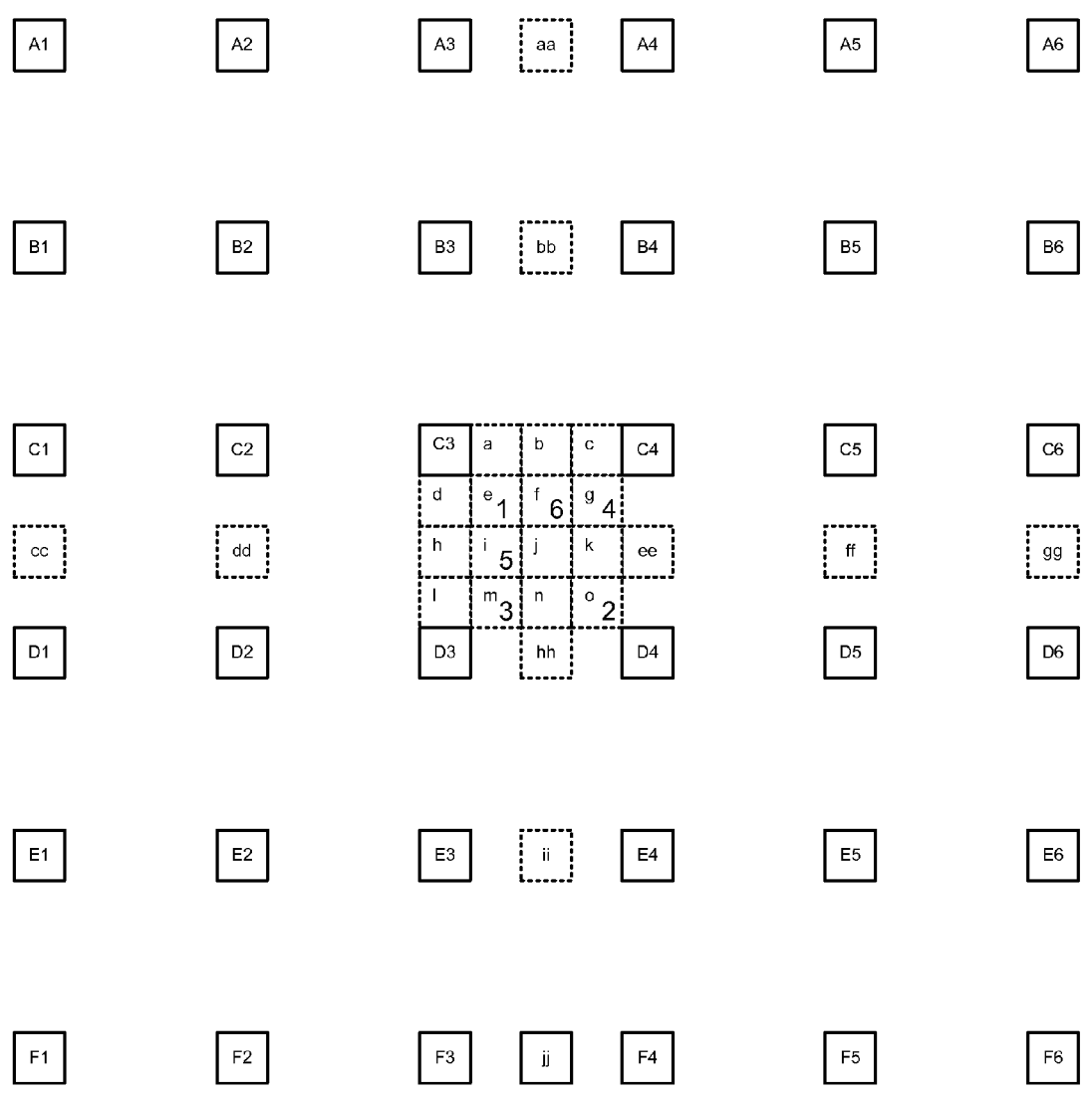

FIG. 5 is a conceptual diagram illustrating integer pixel locations with offset values assigned according to the example method discussed with respect to FIG. 4. In particular, in the example of FIG. 5, it is assumed that the difference between a reference frame and a current frame, rounded to an integer value, i.e., round(DCDiff[idx]), is six. Accordingly, motion compensation unit 35 assigns offset values 1-6 to pixel locations {5, 15, 13, 7, 9, 6}, respectively. In the example of FIG. 5, therefore, pixels "e," "f," "g," "i," "m," and "o," are assigned offset values of 1, 6, 4, 5, 3, and 2, respectively. In accordance with the techniques of this disclosure, motion estimation unit 36 may, when performing a motion search, analyze blocks starting at pixels "e," "f," "g," "i," "m," and "o" because such pixels have defined offset values, even if a normal search algorithm would prescribe skipping blocks starting at one or more of pixels "e," "f," "g," "i," "m," and "o."

Figure 6:
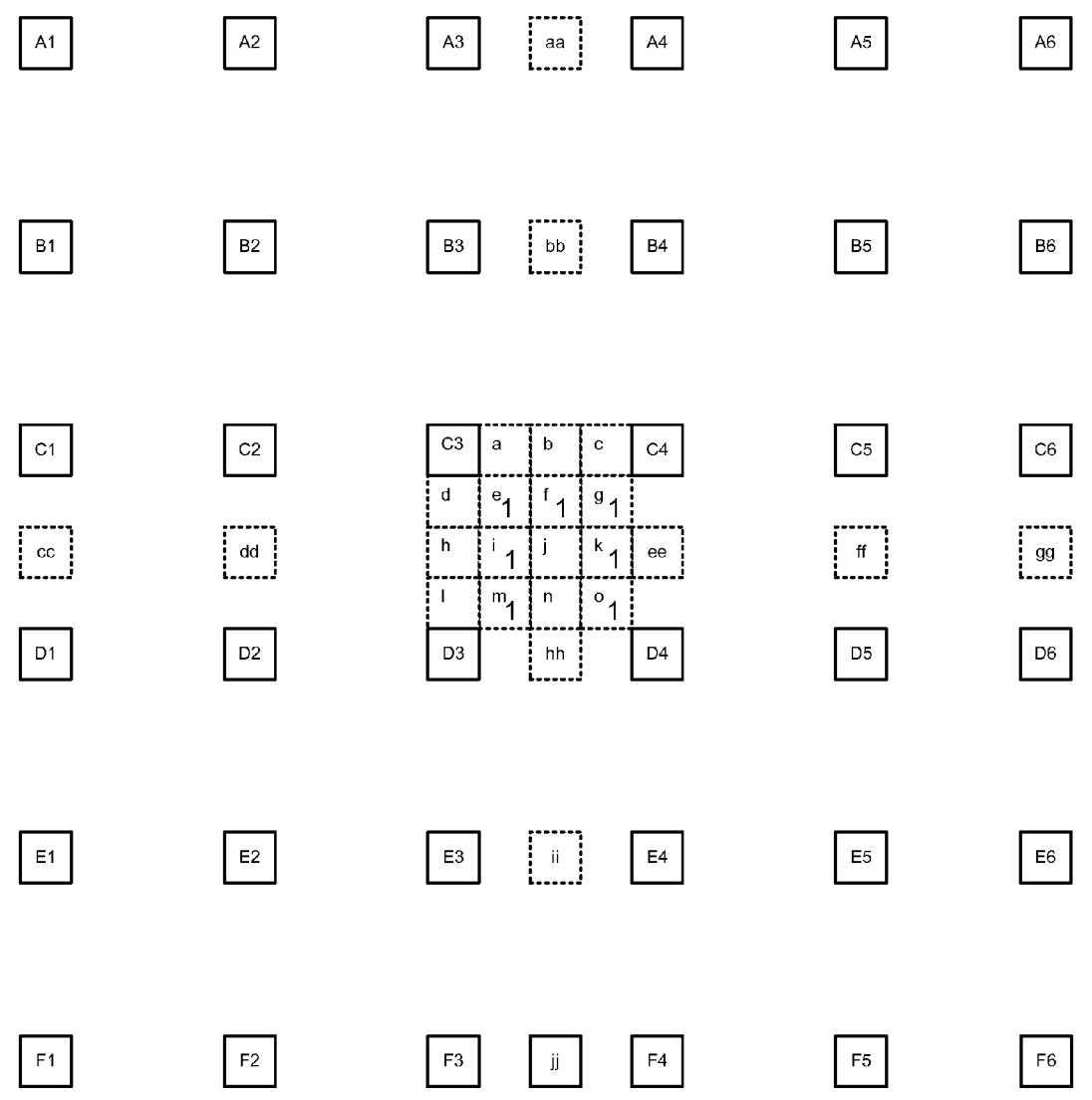

FIG. 6 is another conceptual diagram illustrating integer pixel locations with offset values assigned according to the example method discussed with respect to FIG. 4. In particular, in the example of FIG. 6, it is assumed that the difference between a reference frame and a current frame, i.e., DCDiff [idx], is 0.7. Therefore, DCDiff[idx], when rounded to an integer, is less than numOffsetMin, assuming numOffsetMin is equal to 2, per the example of FIG. 4. DCDiff[idx] divided by 0.1 is seven, so numOffset1 is equal to seven. According to the example method of FIG. 4, a number of offsets equal to numOffsets1 with magnitude of sgn, where sgn is equal to sign(DCDiff[idx]), which is 1 in this example, are added to pixel locations in the order {5, 15, 13, 7, 9, 6, 11, 14}. Accordingly, motion compensation unit 35 assigns offsets of value 1 to pixels "e," "f," "g," "i," "k," "m," and "o," as shown in the example of FIG. 6. In accordance with the techniques of this disclosure, motion estimation unit 36 may, when performing a motion search, analyze blocks starting at pixels "e," "f," "g," "i," "k," "m," and "o," even if a normal motion search algorithm would prescribe skipping blocks starting at one or more of pixel positions "e," "f," "g," "i," "k," "m," and "o."

Figure 7:
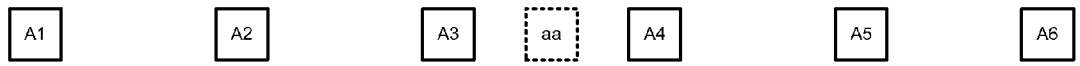
Figure 7:
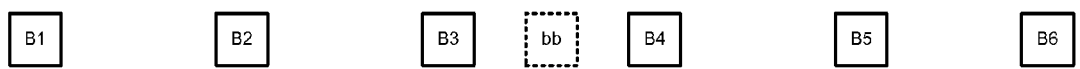
Figure 7:
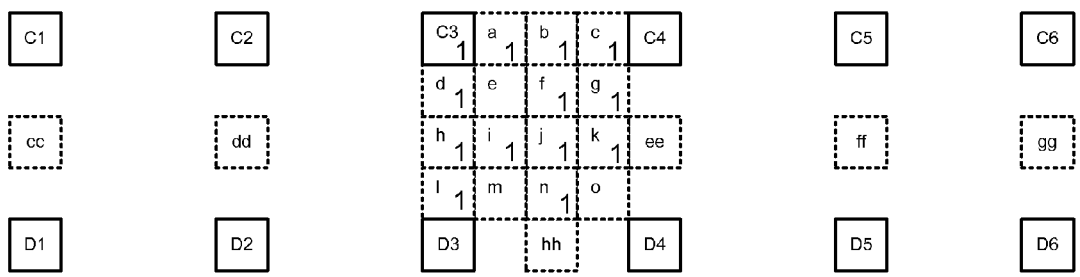
Figure 7:
Figure 7:

FIG. 7 is another conceptual diagram illustrating integer pixel locations with offset values assigned according to the example method discussed with respect to FIG. 4. In particular, in the example of FIG. 7, it is assumed that the difference between a reference frame and a current frame, i.e., DCDiff [idx], is 1.3. Therefore, DCDiff[idx], when rounded to an integer, is less than numOffsetMin, assuming numOffsetMin is equal to 2, per the example of FIG. 4. DCDiff[idx] divided by 0.1 is thirteen, so numOffset1 is equal to thirteen. According to the example method of FIG. 4, eight offsets with magnitude of sgn, where sgn is equal to sign(DCDiff[idx]), which is 1 in this example, are added to pixel locations in the order {0, 1, 2, 3, 4, 8, 10, 12}, and a number of offsets equal to numOffsets1 minus eight (five in this example), with magnitude sgn are added to pixel locations {14, 11, 6, 9, 7, 13, 15, 5}. Accordingly, motion compensation unit 35 assigns offsets of value 1 to pixels "C3," "a," "b," "c," "d," "f," "g," "h," "i," "j," "k," "l," and "n," as shown in the example of FIG. 6. In accordance with the techniques of this disclosure, motion estimation unit 36 may, when performing a motion search, attempt blocks starting at pixels "C3," "a," "b," "c," "d," "f," "g," "h," "i," "j," "k," "l," and "n," even if a normal motion search algorithm would prescribe skipping blocks starting at one or more of pixels "C3," "a," "b," "c," "d," "f," "g," "h," "i," "j," "k," "l," and "n."

Figure 8:
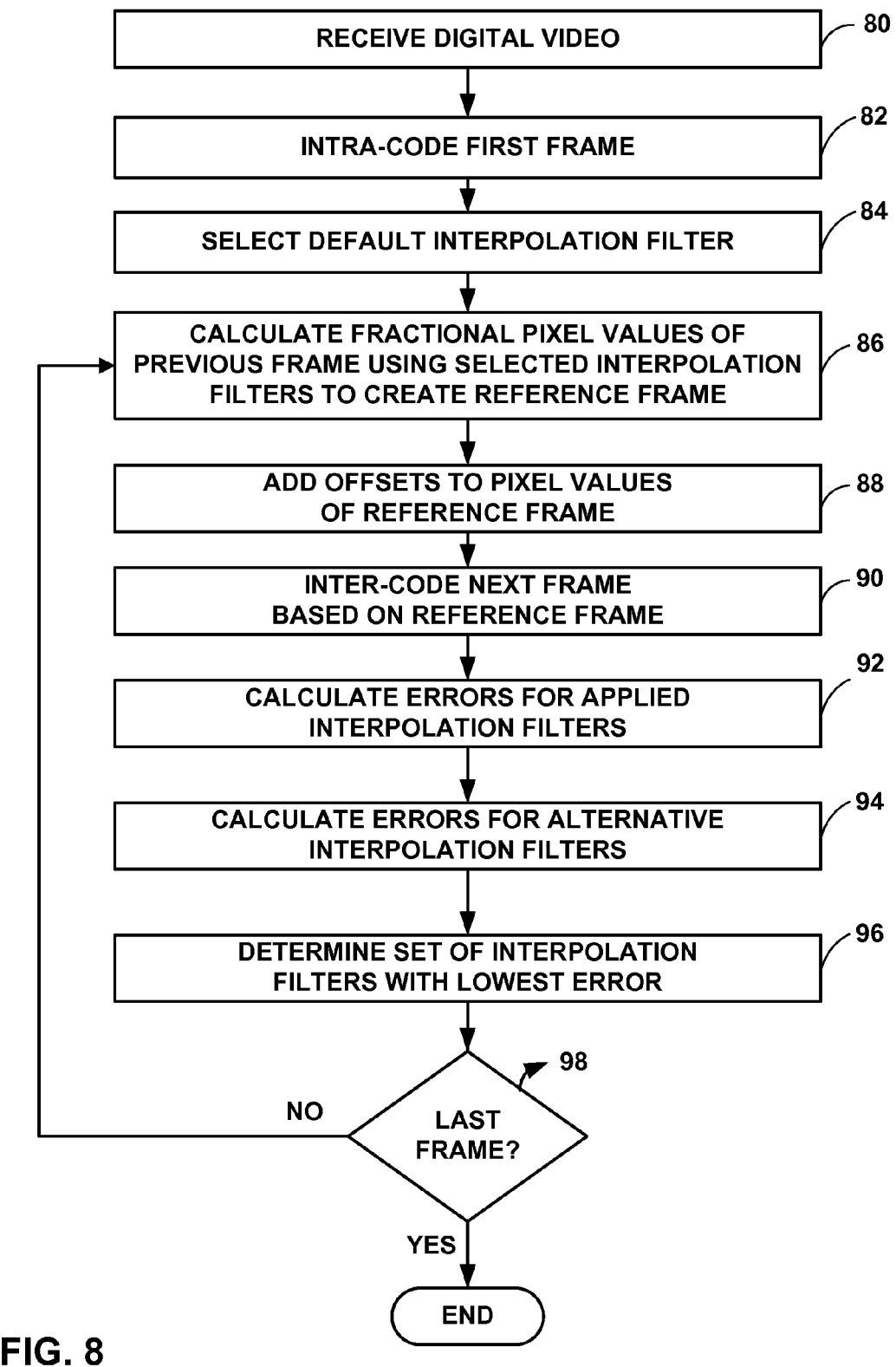
FIG. 8 is a flowchart illustrating example operation of a video encoder in encoding video data with interpolation and offsets.

FIG. 8 is a flowchart illustrating an example operation of video encoder 20 to encode video data in a single pass using switched interpolation filters and offsets. The example method of FIG. 8 illustrates one example method for selecting interpolation filters based on the history of the frames previously encoded. Although described with respect to video encoder 20 (FIG. 2) for purposes of explanation, it should be understood that other video encoders may employ the method described with respect to FIG. 8. Initially, video encoder 20 receives digital video from a video source, such as video source 18 (FIG. 1) (80). The digital video may comprise newly recorded video when video source 18 comprises a video capture device, or prerecorded, unencoded digital video in other cases. The digital video generally comprises a sequence of frames, each frame comprising a plurality of slices and macroblocks. Video encoder 20 encodes the frames in the video sequence as I-frames, P-frames, or B-frames. Within P frames and B frames, some macroblocks may be encoded as I macroblocks.

Video encoder 20 encodes a first frame in a group of pictures (GOP) as an intra-coded I-frame (82). Video encoder 20 then selects a default set interpolation filters 37 to calculate values for sub-integer pixels of the I-frame after the encoded I-frame is decoded to reconstruct a reference frame, e.g., by inverse transform unit 44 (84). Motion compensation unit 35 receives a reconstructed version of the I-frame and calculates values for sub-pixels of the I-frame using a selected set of interpolation filters 37 (86). For a first inter-coded unit, the selected set of filters may be a default set of filters. In particular, for each sub-pixel of the I-frame, motion compensation unit 35 applies a corresponding default interpolation filter to calculate the value of the sub-pixel. The default interpolation filter for one sub-pixel may be different than a default interpolation filter for another sub-pixel of the same I-frame, in some examples. A designer may specify one of the interpolation filters as default for each of the sub-pixel positions. Video encoder 20 may select one of interpolation filters 37 that has historically provided the lowest error for the location of the sub-pixel as the default interpolation filter, or the default interpolation filter may be selected in other ways. In any case, motion compensation unit 35 calculates values for sub-pixels of the I-frame using the default interpolation filter of interpolation filters 37 and stores the I-frame in reference frame store 34.

Motion compensation unit 35 also calculates offset values for one or more of the pixel and sub-pixel locations of the reference frame (88). In some examples, the offset values may represent average pixel value differences between the reference frame and the next frame to be encoded, e.g., a B-frame or a P-frame. Motion compensation unit 35 may utilize any of the methods described with respect to FIG. 4 or elsewhere in this disclosure to calculate and assign offset values to the pixels of the reference frame. After calculating the offset values, motion compensation unit 35 alters the pixel values of the reference frame according to the offset values.

Video encoder 20 then encodes the next frame, e.g., a P-frame or a B-frame, according to the reference frame (90). When the next frame to be encoded is a P-frame, video encoder 20 may encode the frame based on the most recent I-frame or P-frame in reference frame store 34. When the frame is a B-frame, video encoder 20 may encode the frame based on one or more frames of reference frame store 34. Motion estimation unit 36 calculates motion vectors for coded units, e.g., blocks, of the frame based on one or more frames of reference frame store 34. The motion vectors for the blocks point to corresponding, predictive blocks in the reference frame. The motion vectors may refer to integer or sub-integer pixel locations within the reference frame. In the case of sub-integer precision motion vectors, the reference frame is interpolated (86) to produce values at sub-pixel positions, as described above.

During the motion search to calculate the motion vectors, motion estimation unit 36 may skip evaluation of certain integer or sub-integer pixels according to a motion search algorithm. However, motion estimation unit 36 may be configured according to the techniques of this disclosure to evaluate blocks beginning at those integer and sub-integer pixels for which motion compensation unit 35 has applied an offset value, regardless of whether the motion search algorithm specifies skipping that pixel. This is as opposed to some conventional motion estimation units, which would skip these positions according to the motion search algorithm. In one example, motion estimation unit 36 may be configured to explicitly check each of the sub-integer pixel positions to which motion compensation unit 35 has assigned an offset value, even when the conventional motion search algorithm prescribes skipping any or all of those positions. For example, if motion compensation unit 35 assigns the following offset values to the following sub-integer pixel positions in Table 5 below. Table 5 is identical to Table 1 above but is reproduced below for ease of illustration.

TABLE 5

| Position | Offset |
|---|---|
| 0 | 0 |
| 1 | 2 |
| 2 | 0 |
| 3 | 0 |
| 4 | 0 |
| 5 | 3 |
| 6 | 1 |
| 7 | -2 |
| 8 | 0 |
| 9 | 3 |
| 10 | 0 |
| 11 | 2 |
| 12 | 0 |
| 13 | -1 |
| 14 | 1 |
| 15 | 1 |

Then the computation of the SAD for two blocks may be computed 6 times, each time after adding to the reference block one of the "virtual" offsets {-2, -1, 0, 1, 2, 3}. The motion vector having the smallest SAD may be selected. Offset values appearing in more than one position (offset "2," for example, appearing both in sub-pixel position 1 and 11) may be only tried once. That is, a motion estimation unit may search only one of a plurality of sub-pixels each having the same calculated offset value.

Motion compensation unit 35 calculates residual values for each block based on the difference between the current block in the frame being encoded and the predictive block of the reference frame. Video encoder 20 encodes the motion vectors, residuals, and identifiers of applicable interpolation filters, and offset values, e.g., using DCT, quantization and entropy coding, and sends this data to a decoder in the coded bitstream.

Motion compensation unit 35 also determines error values for the frame as encoded using the reference frame with sub-pixels calculated using the selected interpolation filters (92) that were applied for motion estimation. Motion compensation unit 35 also determines error values for each of the other potential interpolation filters that could have been used for each sub-pixel position (94) for motion estimation. In this manner, motion compensation unit 35 may recalculate error values based on different, remaining interpolation filters. For example, motion compensation unit 35 may calculate a cost matrix C[F][I]. For each (f, i), where i corresponds to a sub-pixel position, and f refers to an interpolation filter corresponding to sub-pixel position i, motion compensation unit 35 calculates an accumulated error across the frame for each sub-pixel position i with a value calculated using interpolation filter f, e.g., as described with respect to FIG. 2.

Motion compensation unit 35 may then determine which set of interpolation filters would have resulted in the lowest error value (96). For example, motion compensation unit 35 may iterate across each sub-pixel position and each untried filter to determine a position, and an interpolation filter thereof, that decreases the total error for the frame by the greatest amount. Motion compensation unit 35 may then recalculate the total error for the frame and continue to identify positions and corresponding interpolation filters that reduce the total error for the frame until either a maximum number of iterations have been reached or until the total error decreases by less than a threshold amount. An example of this method is discussed with respect to FIG. 9.

Motion compensation unit 35 may then determine whether the current frame is the last frame in a video sequence, e.g., a group of pictures (GOP), group of frames, or in a full recorded video sequence (98). If not ("NO" branch of 98), motion compensation unit 35 may apply the selected set of interpolation filters to the previously encoded frame to calculate sub-pixel values and encode a subsequent frame with reference to that frame, and potentially another reference frame, when the subsequent frame is a bi-directionally encoded frame. This process may continue on a repeated basis such that interpolation filters determine to produce the lowest error for a previous coding unit, or series of coding units, are used to support motion estimation for a current coding unit. In this manner, selection of interpolation filters to support motion estimation for a current coding unit is based on historical interpolation results for one or more previously coded units. As described above, the interpolation filters may be selected based on cumulative interpolation results with higher weighting given to results for more recent coding units.

Figure 9:
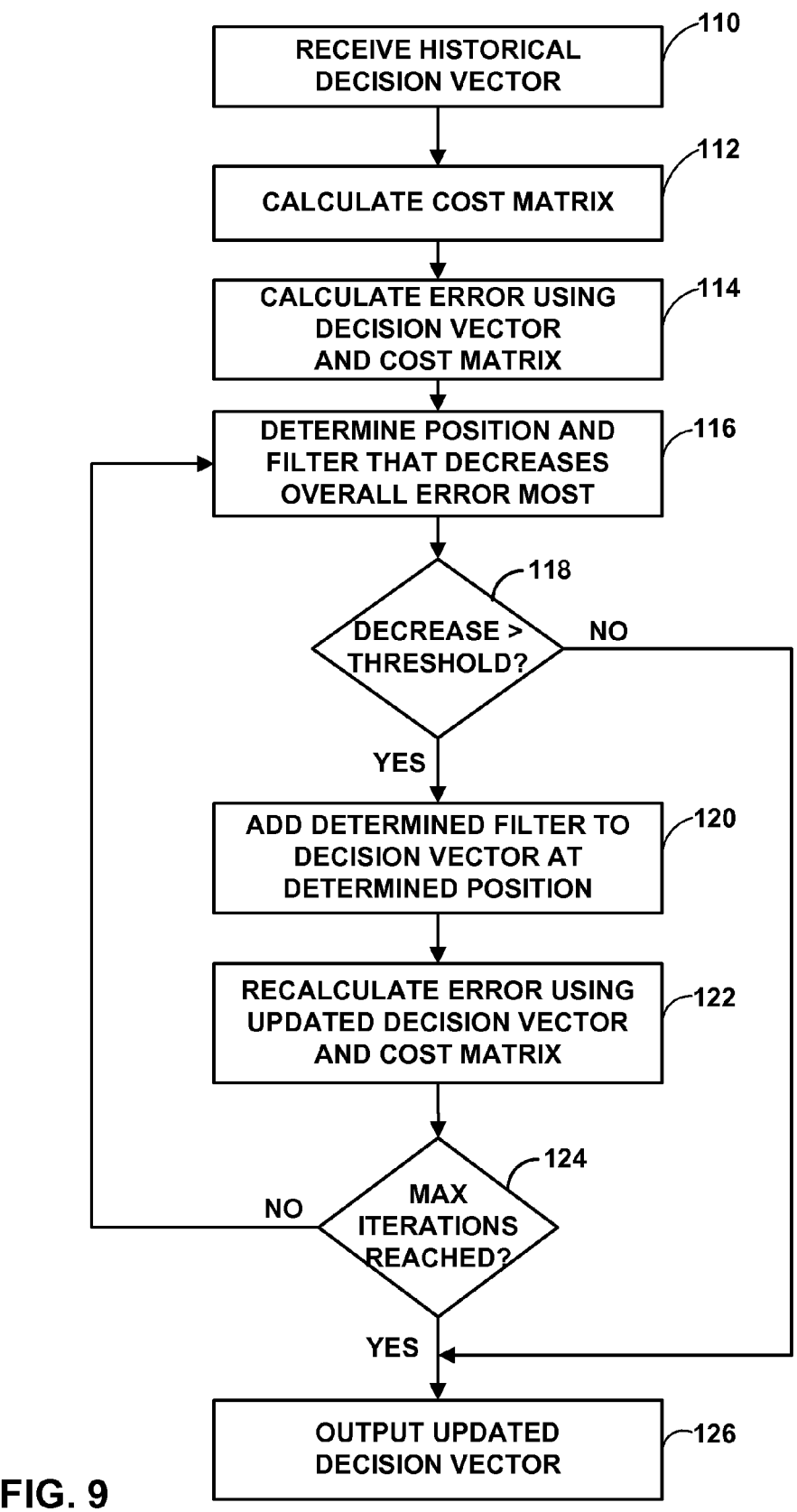
FIG. 9 is a flowchart illustrating an example method for identifying an optimal set of interpolation filters for historical units to calculate interpolated values for sub-pixels of a current unit.

FIG. 9 is a flowchart illustrating an example method for identifying an optimal set of interpolation filters based on historical interpolation results for previously coded frames in order to calculate interpolated values for sub-pixels of a current frame. Initially, motion compensation unit 35 receives a historical decision vector D (110) with element indices ranging from 0 to n-1 for n sub-integer pixel positions. Each element of decision vector D corresponds to an interpolation filter used to calculate the value of the corresponding sub-pixel.

Motion compensation unit 35 then calculates a cost matrix C[F][I], where each i in I corresponds to a sub-integer pixel position and each f in F corresponds to the interpolation filter used to calculate the value of sub-integer pixel i, where C[f][i] is equal to the sum of the error for each sub-integer pixel position i in the current frame with values calculated using interpolation filter f. Thus, where error(x, i) refers to the error value associated with the $i^{th}$ sub-integer pixel relative to pixel x in the frame with respect to the encoded frame, and where each frame has M pixels:

$$C[f][i] = \sum_{k=0}^{M} \text{error}(x, i)$$

Motion compensation unit 35 calculates error values for each interpolation filter of each sub-integer pixel location. In one example, motion compensation unit 35 may further add a fractional value of a cost matrix for a previous frame to the cost matrix of the current frame, e.g., to base the interpolation filter selections on cumulative interpolation error results for a plurality of historical frames, rather than only the reference frame. After calculating the cost matrix, motion compensation unit 35 may calculate an error value for the historical frame(s) (114) by adding the values corresponding to the sub-pixels as calculated by the interpolation filters for the previous frame. That is, motion compensation unit 35 may accumulate each C[f][i] where i corresponds to a sub-pixel position and f corresponds to the interpolation filter used to calculate the value of i, for each i in I. This value, in one example, corresponds to SAD.

Motion compensation unit 35 may then determine a position i and an interpolation filter f for i that reduces the SAD value the most (116). For example, motion compensation unit 35 may iterate through each value in the cost matrix for a sub-pixel and interpolation filter combination that was not used to calculate sub-pixels of the reference frame and compare these values to the corresponding value for the sub-pixel and interpolation filter combination that was used for the reference frame. The greatest difference between an unused sub-pixel position and interpolation filter combination and corresponding sub-pixel position and used interpolation filter is this combination. When this difference is greater than a minimum threshold ("YES" branch of 118), motion compensation unit 35 replaces the used interpolation filter for the sub-pixel position with the newly determined interpolation filter at that position in the decision vector (120) and recalculates the error (e.g., SAD) using this new combination (122). Motion compensation unit 35 may repeat this process until a maximum number of iterations has been reached ("YES" branch of 124) or until the difference described above is less than a predetermined threshold ("NO" branch of 118). Motion compensation unit 35 then outputs the updated decision vector (126). The updated decision vector then can be used to select a set of interpolation filters for a current unit to be coded.

The following pseudocode provides examples for implementing the DC offset techniques of this disclosure. In the pseudocode, "blockDC1" is a procedure for calculating DC offset values DCmin and DCmax for a 16×16 pixel block identified by "input" based on a reference frame identified by "list." "NoSamples" is an integer value that defines a number of samples for the procedure that are available for calculating DCmin and DCmax. "List" is an integer value that identifies a reference frame (referred to as a 'list' according to ITU H.264 terminology). In general, BlockDC1 and BlockDC2 are functions that estimate differences between the luminosity of the reference frame and the luminosity of the frame being encoded (or current frame). The estimated offset can be applied to the reference frame and used to improve motion compensated prediction.

One approach would be to consider the average luminosity of the reference frame and compare it to the average luminosity of the current frame. This solution has the disadvantage that the average luminosity is not representative of local variations. It is possible to have the case of two frames with very different average luminosity that, once motion compensated, result in almost identical macroblocks. This is, for example, the case in which a bright object is unoccluded. A second possibility uses the motion vectors in order to estimate the DC difference between motion compensated blocks. This method is precise, but may have the disadvantage that the motion vectors have to be available, and so it implies that the current frame must be encoded multiple times (at least once to estimate the motion vectors and once to apply the DC offsets to the prediction, an operation that is known to affect the motion information that needs to be recomputed in order to take into account the newly calculated offsets).

The computation of block-based DC difference may overcome problems such as those described above without making use of motion vectors. Computation of block-based DC difference may be based on collection of statistics on the DC difference among collocated blocks of a certain size (e.g., 16×16 pixels). The statistics may be collected in the form of a histogram. In the pseudocode presented below, BlockDC1 and BlockDC2 represent techniques for setting the values of DCmin and DCmax to define a range of offset values. Blocks in the reference frame and current frame are compared and, for each block of pixels, two quantities are computed:

1) The squared error of the pixel differences (err0 in function BlockDC1 or BlockDC2);
2) The squared error of the pixel differences after the average DC of the block is subtracted to the value of each pixel (err1 in function BlockDC1 or BlockDC2).

Estimation of whether the blocks are sufficiently similar (i.e., whether the difference between the collocated blocks is mostly caused by a DC difference) may be based on a comparison of quantities 1) and 2) above. For example, if the error (err0) in 1) is greater than twice the error (err1) in 2), it may be determined that the blocks are not sufficiently similar, and that the difference is not mostly caused by a DC difference. If the co-located blocks are sufficiently similar, the statistics may be accumulated into a vector containing the histogram of the block-based DC differences. In some cases, the DC differences can be quantized by rounding them to integer values.

By inspecting the histogram bins, it is possible to derive a range of DC differences and compute DCmin and DCmax. BlockDC1 calculates DCmin and DCmax values by determining the DC corresponding to the leftmost and the rightmost histogram bins containing more than noSamples samples. BlockDC2 calculates DCmin and DCmax values by counting the number of bins corresponding to positive and negative DC values having more than noSamples samples. Another approach, as a variation of BlockDC2, could be to count the number of bins corresponding to negative and positive DC values having more than noSamples samples, but stop counting the first time the test fails. SetSubpelOffset1 and setSubpelOffset2, in the pseudocode below, are functions that set the offset values (e.g., DCmin, DCmax, and/or values between DCmin and DCmax) of sub-integer pixels of a frame according to calculations performed during execution of corresponding ones of functions BlockDC1 and BlockDC2.

The "BlockDC1" procedure, illustrated by the pseudocode below, is an example of a procedure for setting the values of DCmin and DCmax for a 16×16 pixel block identified by "input."

```
void blockDC1(int list, int *DCmin, int *DCmax, int noSamples)
{
  int i, j, ii, jj, iiLimit, jjLimit, BL_SIZE=16;
  int ref_frame, noPixels;
  double DCOrg, DCRef, DCdiff, temp, err0, err1, ratio;
  int DCInt;
  int DCinterval[2][NO_DC_VAL] = {{0}};
  ref_frame = 0;
  for(i = 0; i < input->img_height; i += BL_SIZE)    //y
  {
   for(j = 0; j < input->img_width; j += BL_SIZE)    //x
   {
    DCOrg = 0.0;
    DCRef = 0.0;
    noPixels = 0;
    err0 = 0.0;
    for(ii = i; ii < i + BL_SIZE; ++ii)    //y
    {
     iiLimit = min(ii, input->img_height – 1);
     for(jj = j; jj < j + BL_SIZE; ++jj)    //x
     {
      jjLimit = min(jj, input->img_width –1);
      DCOrg += imgY_org[iiLimit][jjLimit];
      DCRef += listX[list][ref_frame]->imgY[iiLimit][jjLimit];
      temp = imgY_org[iiLimit][jjLimit] –
        listX[list][ref_frame]->imgY[iiLimit][jjLimit];
      err0 += temp * temp;
      noPixels++;
     }
    }
    DCOrg = DCOrg / (double) noPixels;
    DCRef = DCRef / (double) noPixels;
    DCdiff = (DCOrg – DCRef);
    DCInt = min((int)(fabs(DCdiff) + 0.5), NO_DC_VAL – 1);
    err1 = 0;
    for(ii = i; ii < i + BL_SIZE; ++ii)    //y
    {
     iiLimit = min(ii, input->img_height – 1);
     for(jj = j; jj < j + BL_SIZE; ++jj)    //x
     {
      jjLimit = min(jj, input->img_width – 1);
      temp = (imgY_org[iiLimit][jjLimit] – DCOrg) –
        (listX[list][ref_frame]->imgY[iiLimit][jjLimit] – DCRef);
      err1 += temp * temp;
     }
    }
    ratio = err1 / err0;
    if(err1 < (err0 – err1)) // if (ratio < 1.0/8.0){
    {
     if(DCdiff < 0)
     {
      DCinterval[0][DCInt]++;
      //DCInt = –DCInt;
     }
     else
     {
      DCinterval[1][DCInt]++;
     }
    }
   }
  }
  (*DCmin) = 0;
  (*DCmax) = 0;
  for(i = 0; i < NO_DC_VAL; ++i)
  {
   (*DCmax) = (DCinterval[1][i] >= noSamples)? i: (*DCmax);
// Highest DC obtained on more than noSamples
   (*DCmin) = (DCinterval[0][i] >= noSamples)? i: (*DCmin);
  }
  (*DCmin) = –(*DCmin);
}
```

"SetSubpelOffset1" is a procedure for setting DC offset values of the block identified by "SubpelOffset[16]" in the range between DCmin and DCmax. "List" is an integer value that identifies a reference frame. "ImgOffset" identifies the frame offsets used on reference frames having index greater than zero. In this example, setSubpelOffset1 calls blockDC, which may invoke the procedure of blockDC1, presented above.

```
void setSubpelOffset1(int list, int subpelOffset[16],
  int imgOffset[16])
{
  int subPelPosOrder[15] = {5, 15, 13, 7, 9, 6, 11, 14, 1, 4, 3,
    12, 10, 2, 8};
  int subPelPosVal[8] = {1, 2, 3, 4, 5, 6, 7, 8};
  int i, j, sign, DCmin, DCmax, roundFact;
  int ref_frame, noOffsets, noOffsets1, thFullPel0=8, DCint,
firstVal, secondVal, addOffset;
  double DCOrg = 0, DCRef = 0;
  double DCdiff[MAX_REFERENCE_PICTURES];
  memset(DCdiff, 0, MAX_REFERENCE_PICTURES *
    sizeof(double));
  for(i = 0; i < 16; ++i)
   img->offsetMETab[i][list] = 0;
  for(ref_frame = 0; ref_frame < listXsize[list]; ++ref_frame)
  {
   DCOrg = 0.0;
   DCRef = 0.0;
   for(i = 0; i < input->img_height; ++i) //y
   {
    for(j = 0; j < input->img_width; ++j) //x
    {
     DCOrg += imgY_org[i][j];
     DCRef += listX[list][ref_frame]->imgY[i][j];
    }
   }
   DCdiff[ref_frame] = (DCOrg – DCRef) /
(double)(input->img_height * input->img_width);
   if(ref_frame == 0) // further refinement to DC values
   {
    sign = (DCdiff[ref_frame] >= 0)? 1: –1;
    noOffsets = (int)(fabs(DCdiff[ref_frame]) + 0.5);
    DCint = noOffsets * sign;
    blockDC(list, &DCmin, &DCmax, 32 – 16 * (noOffsets >= 2));
    DCmax = max(DCint, DCmax);
```

```
        DCmin = min(DCint, DCmin);
        roundFact = (int)ceil((double)(DCmax - DCmin) / 15.0);
        roundFact = max(roundFact, 1);
        DCmin = -roundFact * (int)(fabs(DCmin) / roundFact + 0.5);
        DCmax = roundFact * (int)(fabs(DCmax) / roundFact + 0.5);
      }
      noOffsets1 = 0;
      if(noOffsets < 2)
        noOffsets1 = min((int)(fabs(DCdiff[ref_frame]) / 0.1 + 0.5), 15);
      firstVal = 0;
      secondVal = sign;
      if(noOffsets1 > thFullPel0)
      {
        firstVal = sign;
        secondVal = 0;
        noOffsets1 = 16 - noOffsets1;
      }
      addOffset = -firstVal;
      for(i = 0; i < 16; ++i)
        subpelOffset[i] = firstVal;
      img->noOffsets[list] = 0;
      for(i = DCmin; i <= DCmax; i += roundFact)
      {
        if((i != firstVal) && (i != secondVal))
        {
          subpelOffset[subPelPosOrder[img->noOffsets[list]]] = i;
#ifdef SEARCH_WITH_OFFSET
          img->offsetMETab[img->noOffsets[list]][list] = i + addOffset;
#endif
          (img->noOffsets[list])++;
          if(img->noOffsets[list] == 15)
            break;
        }
      }
#ifdef SEARCH_WITH_OFFSET
      img->noMEOffsets[list] = img->noOffsets[list];
      if((img->noOffsets[list] < 15) && (noOffsets1 > 0))
        img->offsetMETab[++(img->noMEOffsets[list])][list] =
secondVal + addOffset;
#endif
      for(i = 0; i < noOffsets1; ++i)
      {
        if(img->noOffsets[list] == 15)
          break;
        subpelOffset[subPelPosOrder[img->noOffsets[list]]] = secondVal;
        (img->noOffsets[list])++;
      }
    }
    else
    {
      sign = (DCdiff[ref_frame] >= 0)? 1: -1;
      imgOffset[ref_frame] = min((int)(fabs(DCdiff[ref_frame]) +
0.5), 1);
      if(sign < 0)
        imgOffset[ref_frame] = -imgOffset[ref_frame];
    }
  }
}
```

The "BlockDC2" procedure, illustrated by the pseudocode below, is an example of another procedure for setting the values of DCmin and DCmax for a 16×16 pixel block identified by "input." DCmin and DCmax are pointers to the values calculated by BlockDC2, which another procedure may use as a range for setting DC values of the block between DCmin and DCmax. "NoSamples" is an integer value that defines a number of samples for the procedure that are available for calculating the DC offset values.

```
void blockDC2(int *DCmin, int *DCmax, int noSamples)
{
  int i, j, ii, jj, iiLimit, jjLimit, BL_SIZE=16;
  int ref_frame, noPixels;
  double DCOrg=0, DCRef=0, DCdiff, temp, err0, err1, ratio;
  int DCInt, DCinterval[2][NO_DC_VAL];
  memset(DCinterval, 0, 2*NO_DC_VAL*sizeof(int));
  ref_frame = 0;
  DCOrg=0; DCRef=0;
  for(i = 0; i < input->img_height; i+=BL_SIZE){   //y
    for(j = 0; j < input->img_width; j+=BL_SIZE){  //x
      DCOrg=0; DCRef=0; noPixels=0;
      for(ii = i; ii<i+BL_SIZE ; ii++){ //y
        iiLimit=min(ii, input->img_height-1);
        for(jj = j; jj < j+BL_SIZE; jj++){ //x
          jjLimit=min(jj, input->img_width-1);
          DCOrg+= imgY_org[iiLimit][jjLimit];
          DCRef+= listX[LIST_0][ref_frame]-
>imgY[iiLimit][jjLimit];
          noPixels++;
        }
      }
      DCdiff=(DCOrg-DCRef)/(double)noPixels;
      DCOrg=DCOrg/(double)noPixels;
      DCRef=DCRef/(double)noPixels;
      err0=0;
      for(ii = i; ii<i+BL_SIZE ; ii++){  //y
        iiLimit=min(ii, input->img_height-1);
        for(jj = j; jj < j+BL_SIZE; jj++){ //x
          jjLimit=min(jj, input->img_width-1);
          temp = imgY_org[iiLimit][jjLimit]-
listX[LIST_0][ref_frame]->imgY[iiLimit][jjLimit];
          err0 += temp*temp;
        }
      }
      err1=0;
      for(ii = i; ii<i+BL_SIZE; ii++){  //y
        iiLimit=min(ii, input->img_height-1);
        for(jj = j; jj < j+BL_SIZE; jj++){ //x
          jjLimit=min(jj, input->img_width-1);
          temp = (imgY_org[iiLimit][jjLimit]-DCOrg)-
(listX[LIST_0][ref_frame]->imgY[iiLimit][jjLimit]-DCRef);
          err1 += temp*temp;
        }
      }
      DCInt=min((int)(fabs(DCdiff)+0.5), NO_DC_VAL-1);
      if (err1<(err0-err1)){
        if (DCdiff<0){
          DCinterval[0][DCInt]++;
          DCInt=-DCInt;
        }
        else{
          DCinterval[1][DCInt]++;
        }
      }
    }
  }
  (*DCmin)=0; (*DCmax)=0;
  for (i=0; i<NO_DC_VAL; i++){
    (*DCmax)=(DCinterval[1][i]>=noSamples)? (*DCmax)+1 :
(*DCmax);
    (*DCmin)=(DCinterval[0][i]>=noSamples)? (*DCmin)+1 :
(*DCmin);
  }
  (*DCmin)=-(*DCmin);
}
```

"SetSubpelOffset2" is a procedure that sets offset values for sub-integer pixel positions for the block identified by "input" in the range between DCmin and DCmax. In this example, setSubpelOffset1 calls blockDC, which may invoke the procedures of either blockDC1 or blockDC2, presented above.

```
void setSubpelOffset2( )
{
    int subPelPosOrder[15]={5, 15, 13, 7, 9, 6, 11, 14, 1, 4, 3, 12, 10, 2, 8};
    int i, j, sign, DCmin, DCmax;
    int ref_frame, noOffsets, noOffsetsSecond, thFullPel0=8, DCint, firstVal, secondVal,
addOffset;
    double DCOrg=0, DCRef=0;
    double DCdiff[5];
    img->filterParam=0;
    memset(DCdiff, 0, 5*sizeof(double));
    for (ref_frame = 0; ref_frame < listxsize[LIST_0]; ref_frame++){
        DCOrg=0; DCRef=0;
        for(i = 0; i < input->img_height; i++){    //y
            for(j = 0; j < input->img_width; j++){    //x
                DCOrg+= imgY_org[i][j];
                DCRef+= listx[LIST_0][ref_frame]->imgY[i][j];
            }
        }
        DCdiff[ref_frame]=(DCOrg-DCRef)/(double)(input->img_height*input->
img_width);
        if (ref_frame==0){
            sign=DCdiff[ref_frame]>=0 ? 1 : -1;
            noOffsets=(int)(fabs(DCdiff[ref_frame])+0.5);
            DCint=noOffsets*sign;
            //blockDC(&DCmin, &DCmax, 1); //0
            //blockDC(&DCmin, &DCmax, 2-(noOffsets>=2)); // 1
            blockDC(&DCmin, &DCmax, 2); // 2
            //blockDC(&DCmin, &DCmax, 4); // 3
            //blockDC(&DCmin, &DCmax, 8); // 4
            //blockDC(&DCmin, &DCmax, 8); // 0          -10.2541
            //blockDC(&DCmin, &DCmax, 16-8*(noOffsets>=2)); // 1      -10.1935
            //blockDC(&DCmin, &DCmax, 16); // 2             -10.2078
            //blockDC(&DCmin, &DCmax, 32-16*(noOffsets>=2)); // 3    -10.0972
            //blockDC(&DCmin, &DCmax, 32); // 4            -10.1632
            //blockDC(&DCmin, &DCmax, 64-32*(noOffsets>=2)); // 5    -9.9767
            DCmax=(DCint>DCmax)? DCint : DCmax;
            DCmin=(DCint<DCmin)? DCint : DCmin;
            img->roundFact=(int)ceil((double)(DCmax-DCmin)/15.0);
            img->roundFact=max(img->roundFact,1);
            img->DCmin=(int)(fabs(DCmin)/img->roundFact+0.5);
            img->DCmax=(int)(fabs(DCmax)/img->roundFact+0.5);
            DCmin=-img->roundFact*img->DCmin;
            DCmax=img->roundFact*img->DCmax;
            noOffsetsSecond=0;
            if (noOffsets<2){
                noOffsetsSecond=min((int)(fabs(DCdiff[ref_frame])/0.1+0.5),15);
            }
            if (noOffsetsSecond>0){
                firstVal=0; secondVal=sign;
                //if (noOffsetsSecond>thFullPel0){
                if (fabs(DCdiff[ref_frame])>0.5){
                    firstVal=sign; secondVal=0;
                    noOffsetsSecond=16-noOffsetsSecond;
                }
            }
            else{
                firstVal=0; secondVal=0;
            }
#if FULL_PEL_DC==1
            addOffset=-DCint;
            printf("%f %d %d\n", DCdiff[ref_frame], DCint, firstVal);
#else
            addOffset=-firstVal;
            printf("%d %d %d %d\n", firstVal, secondVal, DCmin, DCmax);
#endif
            if ((firstVal==DCmin && secondVal==DCmax) || (firstVal==DCmax &&
secondVal==DCmin)){
                DCmin=0; DCmax=0;
                img->DCmin=0; img->DCmax=0;
            }
            for (i=0; i<16; i++){
                img->samplePosOffset[i] = firstVal;
            }
            img->noOffsets=0;
            for (i=DCmin; i<=DCmax; i+=img->roundFact){
                if (i!=firstVal && i!=secondVal){
                    img->samplePosOffset[subPelPosOrder[img->noOffsets]] = i;
#if SEARCH_WITH_OFFSET==1
                    img->offsetMETab[img->noOffsets]=i+addOffset;
#endif
                    img->noOffsets++;
```

```
        if (img->noOffsets==15)
          break;
        }
      }
    #if SEARCH_WITH_OFFSET==1
      img->noMEOffsets=img->noOffsets;
      if (img->noOffsets<15 && noOffsetsSecond>0){
        img->offsetMETab[img->noMEOffsets] = secondVal+addOffset;
        img->noMEOffsets++;
      }
    #endif
        for (i=0; i<noOffsetsSecond; i++){
          if (img->noOffsets==15)
            break;
          img->samplePosOffset[subPelPosOrder[img->noOffsets]] = secondVal;
          img->noOffsets++;
        }
        img->firstVal=firstVal;
        img->secondVal=secondVal;
        img->noOffsetsSecond=noOffsetsSecond;
    #if FULL_PEL_DC==1
        img->samplePosOffset[0] = DCint;
    #endif
      }
      else{
        sign=DCdiff[ref_frame]>=0 ? 1 : -1;
        img->imgOffset[ref_frame]=min((int)(fabs(DCdiff[ref_frame])+0.5),1);
        if (sign<0){
          img->imgOffset[ref_frame]=-img->imgOffset[ref_frame];
        }
        if (img->imgOffset[ref_frame]!=0){
          img->filterParam=1;
        }
      }
    }
    for (i=0; i<16; i++){
      if (img->samplePosOffset[i]!=0){
        img->filterParam=1;
      }
    }
  }
}
```

The techniques of this disclosure may be realized in a wide variety of devices or apparatuses, including a wireless handset, an integrated circuit (IC) or a set of ICs (i.e., a chip set). Any components, modules or units have been described provided to emphasize functional aspects and does not necessarily require realization by different hardware units.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described herein may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A video encoding method comprising:
selecting, from a respective set of interpolation filters mapped to each sub-integer pixel of a reference video unit, an interpolation filter for each sub-integer pixel, wherein the reference video unit is used to support motion estimation of a current video unit to be coded, and wherein the selection is performed before the motion estimation is performed on the current video unit;

interpolating pixel values for each sub-integer pixel of the reference video unit using the selected interpolation filter, wherein the interpolation is performed before the motion estimation is performed on the current video unit;

applying signed DC offset values to the interpolated pixel values for at least some of the sub-integer pixels of the reference video unit before the motion estimation is performed on the current video unit, wherein the DC offset values are determined from DC value differences between at least portions of the reference video unit and the current video unit;

configuring a motion search operation of the motion estimation to evaluate sub-integer pixels having non-zero DC offset values applied to the interpolated pixel values; and encoding a block of the current video unit using the motion estimation, wherein the motion estimation is based on the reference video unit and the configured motion search operation, and wherein the motion estimation is performed only once for the block such that the encoding of the block is performed in a single pass.

2. The method of claim 1, wherein selecting an interpolation filter for each sub-integer pixel is based on historical interpolation results for one or more previously encoded video units.

3. The method of claim 2, wherein selecting an interpolation filter for each sub-integer pixel comprises:
determining a first interpolation error value for a first set of interpolation filters used to encode a previously encoded video unit;
determining a second interpolation error value for a second set of interpolation filters;
comparing the first interpolation error value and the second interpolation error value; and
selecting the interpolation filter for each sub-integer pixel based on the comparison.

4. The method of claim 2, wherein selecting an interpolation filter for each sub-integer pixel comprises:
accumulating interpolation error values for different interpolation filters used to encode a plurality of previously encoded video units; and
selecting the interpolation filter for each sub-integer pixel based on the accumulated interpolation error values.

5. The method of claim 2, wherein the interpolation filter for a first sub-integer pixel of the reference video unit is different from the interpolation filter for a second sub-integer pixel of the reference video unit.

6. The method of claim 2, further comprising encoding syntax elements indicating the interpolation filter for each sub-integer pixel and the offsets used to produce the encoded block.

7. The method of claim 1, wherein encoding the block comprises:
performing motion estimation to identify a predictive block of the reference video unit for the block of the current video unit;
determining a motion vector that identifies the predictive bock of the reference video unit; and
determining a residual error between the block of the current video unit and the predictive block of the reference video unit.

8. The method of claim 7, wherein performing motion estimation comprises executing the motion search operation configured to evaluate sub-integer pixels having non-zero offset values such that evaluation of those sub-integer pixels is not skipped.

9. The method of claim 1, wherein each of the reference video unit and the current video unit comprises one of a video frame or a video slice.

10. The method of claim 1, wherein applying the signed offset values comprises applying a signed value to at least one of the luma and chroma values of the at least some of the sub-integer pixels of the reference video unit.

11. The method of claim 1, wherein a handset including a processor and a memory transmits the encoded block to a destination device.

12. A video encoding apparatus comprising a video encoder configured to:
select, from a respective set of interpolation filters mapped to each sub-integer pixel of a reference video unit, an interpolation filter for each sub-integer pixel, wherein the reference video unit is used to support motion estimation of a current video unit to be coded, and wherein the selection is performed before the motion estimation is performed on the current video unit;
interpolate pixel values for each sub-integer pixel of the reference video unit using the selected interpolation filter, wherein the interpolation is performed before the motion estimation is performed on the current video unit;
apply signed DC offset values to the interpolated pixel values for at least some of the sub-integer pixels of the reference video unit before the motion estimation is performed on the current video unit, wherein the DC offset values are determined from DC value differences between at least portions of the reference video unit and the current video unit;
configure a motion search operation of the motion estimation to explicitly evaluate sub-integer pixels having non-zero DC offset values assigned to the interpolated pixel values; and
encode a block of the current video unit using the motion estimation, wherein the motion estimation is based on the reference video unit and the configured motion search operation, and wherein the motion estimation is performed only once for the block such that the encoding of the block is performed in a single pass.

13. The apparatus of claim 12, wherein the video encoder is configured to select the interpolation filter for each sub-integer pixel based on historical interpolation results for one or more previously encoded video units.

14. The apparatus of claim 13, wherein the video encoder is configured to select the interpolation filter for each sub-integer pixel by being further configured to:
determine a first interpolation error value for a first set of interpolation filters used to encode a previously encoded video unit;
determine a second interpolation error value for a second set of interpolation filters;
compare the first interpolation error value and the second interpolation error value; and
select the interpolation filter for each sub-integer pixel based on the comparison.

15. The apparatus of claim 13, wherein the video encoder is configured to select the interpolation filter for each sub-integer pixel by being further configured to:
accumulate interpolation error values for different interpolation filters used to encode a plurality of previously encoded video units; and
select the interpolation filter for each sub-integer pixel based on the accumulated interpolation error values.

16. The apparatus of claim 13, the interpolation filter for a first sub-integer pixel of the reference video unit is different from the interpolation filter for a second sub-integer pixel of the reference video unit.

17. The apparatus of claim 13, wherein the video encoder is configured to encode syntax elements indicating the interpolation filter for each sub-integer pixel and the offsets used to produce the encoded block.

18. The apparatus of claim 12, wherein the video encoder is configured to:
perform motion estimation to identify a predictive block of the reference video unit for the block of the current video unit;
determine a motion vector that identifies the predictive bock of the reference video unit; and
determine a residual error between the block of the current video unit and the predictive block of the reference video unit.

19. The apparatus of claim 18, wherein the video encoder is configured to perform motion estimation by being further configured to execute the motion search operation configured to explicitly evaluate sub-integer pixels having non-zero values such that evaluation of those sub-integer pixels is not skipped.

20. The apparatus of claim 12, wherein each of the reference video unit and the current video unit comprises one of a video frame or a video slice.

21. The apparatus of claim 12, wherein the video encoder forms part of a wireless communication device.

22. The apparatus of claim 12, wherein the video encoder comprises an integrated circuit device.

23. The apparatus of claim 12, wherein a handset including a processor and a memory transmits the encoded block to a destination device.

24. A video encoding apparatus comprising:
means for selecting, from a respective set of interpolation filters mapped to each sub-integer pixel of a reference video unit, an interpolation filter for each sub-integer pixel, wherein the reference video unit is used to support motion estimation of a current video unit to be coded, and wherein the selection is performed before the motion estimation is performed on the current video unit;
means for interpolating pixel values for each sub-integer pixel of the reference video unit using the selected interpolation filter, wherein the interpolation is performed before the motion estimation is performed on the current video unit;
means for applying signed DC offset values to the interpolated pixel values for at least some of the sub-integer pixels of the reference video unit before the motion estimation is performed on the current video unit, wherein the DC offset values are determined from DC value differences between at least portions of the reference video unit and the current video unit;
means for configuring a motion search operation of the motion estimation to evaluate sub-integer pixels having non-zero DC offset values applied to the interpolated pixel values; and
means for encoding a block of the current video unit using the motion estimation, wherein the motion estimation is based on the reference video unit and the configured motion search operation, and wherein the motion estimation is performed only once for the block such that the encoding of the block is performed in a single pass.

25. The apparatus of claim 24, wherein selection of the interpolation filter for each sub-integer pixel is based on historical interpolation results for one or more previously encoded video units.

26. The apparatus of claim 25, wherein the means for selecting an interpolation filter for each sub-integer pixel comprises:
means for determining a first interpolation error value for a first set of interpolation filters used to encode a previously encoded video unit;
means for determining a second interpolation error value for a second set of interpolation filters;
means for comparing the first interpolation error value and the second interpolation error value; and
means for selecting the interpolation filter for each sub-integer pixel based on the comparison.

27. The apparatus of claim 25, wherein the means for selecting an interpolation filter for each sub-integer pixel comprises:
means for accumulating interpolation error values for different interpolation filters used to encode a plurality of previously encoded video units; and
means for selecting the interpolation filter for each sub-integer pixel based on the accumulated interpolation error values.

28. The apparatus of claim 25, wherein the interpolation filter for a first sub-integer pixel of the reference video unit is different from the interpolation filter for a second sub-integer pixel of the reference video unit.

29. The apparatus of claim 25, further comprising means for encoding syntax elements indicating the interpolation filter for each sub-integer pixel and the offsets used to produce the encoded block.

30. The apparatus of claim 24, wherein the means for encoding the block comprises:
means for performing motion estimation to identify a predictive block of the reference video unit for the block of the current video unit;
means for determining a motion vector that identifies the predictive bock of the reference video unit; and
means for determining a residual error between the block of the current video unit and the predictive block of the reference video unit.

31. The apparatus of claim 30, wherein the means for performing motion estimation comprises means for executing the motion search operation configured to evaluate sub-integer pixels having non-zero offset values such that evaluation of those sub-integer pixels is not skipped.

32. The apparatus of claim 24, wherein each of the reference video unit and the current video unit comprises one of a video frame or a video slice.

33. A non-transitory computer-readable storage medium encoded with instructions for causing a processor to:
select, from a respective set of interpolation filters mapped to each sub-integer pixel of a reference video unit, an interpolation filter for each sub-integer pixel, wherein the reference video unit is used to support motion estimation of a current video unit to be coded, and wherein the selection is performed before the motion estimation is performed on the current video unit;
interpolate pixel values for each sub-integer pixel of the reference video unit using the selected interpolation filter, wherein the interpolation is performed before the motion estimation is performed on the current video unit;
apply signed DC offset values to the interpolated pixel values for at least some of the sub-integer pixels of the reference video unit before the motion estimation is performed on the current video unit, wherein the DC offset values are determined from DC value differences between at least portions of the reference video unit and the current video unit;

configure a motion search operation of the motion estimation to evaluate sub-integer pixels having non-zero DC offset values applied to the interpolated pixel values; and encode a block of the current video unit using the motion estimation, wherein the motion estimation is based on the reference video unit and the configured motion search operation, and wherein the motion estimation is performed only once for the block such that the encoding of the block is performed in a single pass.

34. The non-transitory storage medium of claim 33, further comprising instructions to cause the processor to select the interpolation filter for each sub-integer pixel based on historical interpolation results for one or more previously encoded video units.

35. The non-transitory storage medium of claim 34, further comprising instructions to cause the processor to:

determine a first interpolation error value for a first set of interpolation filters used to encode a previously encoded video unit;

determine a second interpolation error value for a second set of interpolation filters;

compare the first interpolation error value and the second interpolation error value; and select the interpolation filter for each sub-integer pixel based on the comparison.

36. The non-transitory storage medium of claim 34, further comprising instructions to cause the processor to:

accumulate interpolation error values for different interpolation filters used to encode a plurality of previously encoded video units; and select the interpolation filter for each sub-integer pixel based on the accumulated interpolation error values.

37. The non-transitory storage medium of claim 34, wherein the interpolation filter for a first sub-integer pixel of the reference video unit is different from the interpolation filter for a second sub-integer pixel of the reference video unit.

38. The non-transitory storage medium of claim 34, further comprising instructions to cause the processor to encode syntax elements indicating the interpolation filter for each sub-integer pixel and the offsets used to produce the encoded block.

39. The non-transitory storage medium of claim 34, further comprising instructions to cause the processor to:

perform motion estimation to identify a predictive block of the reference video unit for the block of the current video unit;

determine a motion vector that identifies the predictive bock of the reference video unit; and determine a residual error between the block of the current video unit and the predictive block of the reference video unit.

40. The non-transitory storage medium of claim 39, further comprising instructions to cause the processor to:

execute the motion search operation configured to evaluate sub-integer pixels having non-zero offset values such that evaluation of those sub-integer pixels is not skipped.

41. The non-transitory storage medium of claim 33, wherein each of the reference video unit and the current video unit comprises one of a video frame or a video slice.

\* \* \* \* \*